(12) United States Patent
Sankrithi

(10) Patent No.: US 6,928,363 B2
(45) Date of Patent: Aug. 9, 2005

(54) AUTOTILLER CONTROL SYSTEM FOR AIRCRAFT

(75) Inventor: Mithra M. K. V. Sankrithi, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/251,407

(22) Filed: Sep. 20, 2002

(65) Prior Publication Data

US 2004/0059497 A1 Mar. 25, 2004

(51) Int. Cl.$^7$ .............................. G01C 21/00; B64F 1/22; B64C 25/50
(52) U.S. Cl. ........................ 701/120; 701/206; 244/50
(58) Field of Search ................................ 701/120, 206, 701/205, 3, 4, 118; 244/50, 181, 103 R, 192; 340/940; 342/63

(56) References Cited

U.S. PATENT DOCUMENTS

| | | | | |
|---|---|---|---|---|
| 3,067,832 A | * | 12/1962 | Wohl | 244/50 |
| 3,753,540 A | * | 8/1973 | Renner | 244/50 |
| 3,757,887 A | * | 9/1973 | Moore et al. | 180/168 |
| 3,807,664 A | * | 4/1974 | Kelly et al. | 244/50 |
| 3,998,412 A | * | 12/1976 | Baker et al. | 244/189 |
| 4,151,595 A | * | 4/1979 | Pressiat | 701/120 |
| 4,911,604 A | * | 3/1990 | Pollner et al. | 414/428 |
| 5,008,825 A | * | 4/1991 | Nadkarni et al. | 701/4 |
| 5,314,287 A | * | 5/1994 | Wichert | 414/427 |
| 5,646,854 A | * | 7/1997 | Bevan | 701/206 |

* cited by examiner

*Primary Examiner*—Tan Q. Nguyen
*Assistant Examiner*—Dalena Tran

(57) ABSTRACT

An automatic guidance and control system for aircraft moving on the ground. On-ground taxi control is provided in response to steering commands for nosewheel positioning.

31 Claims, 23 Drawing Sheets

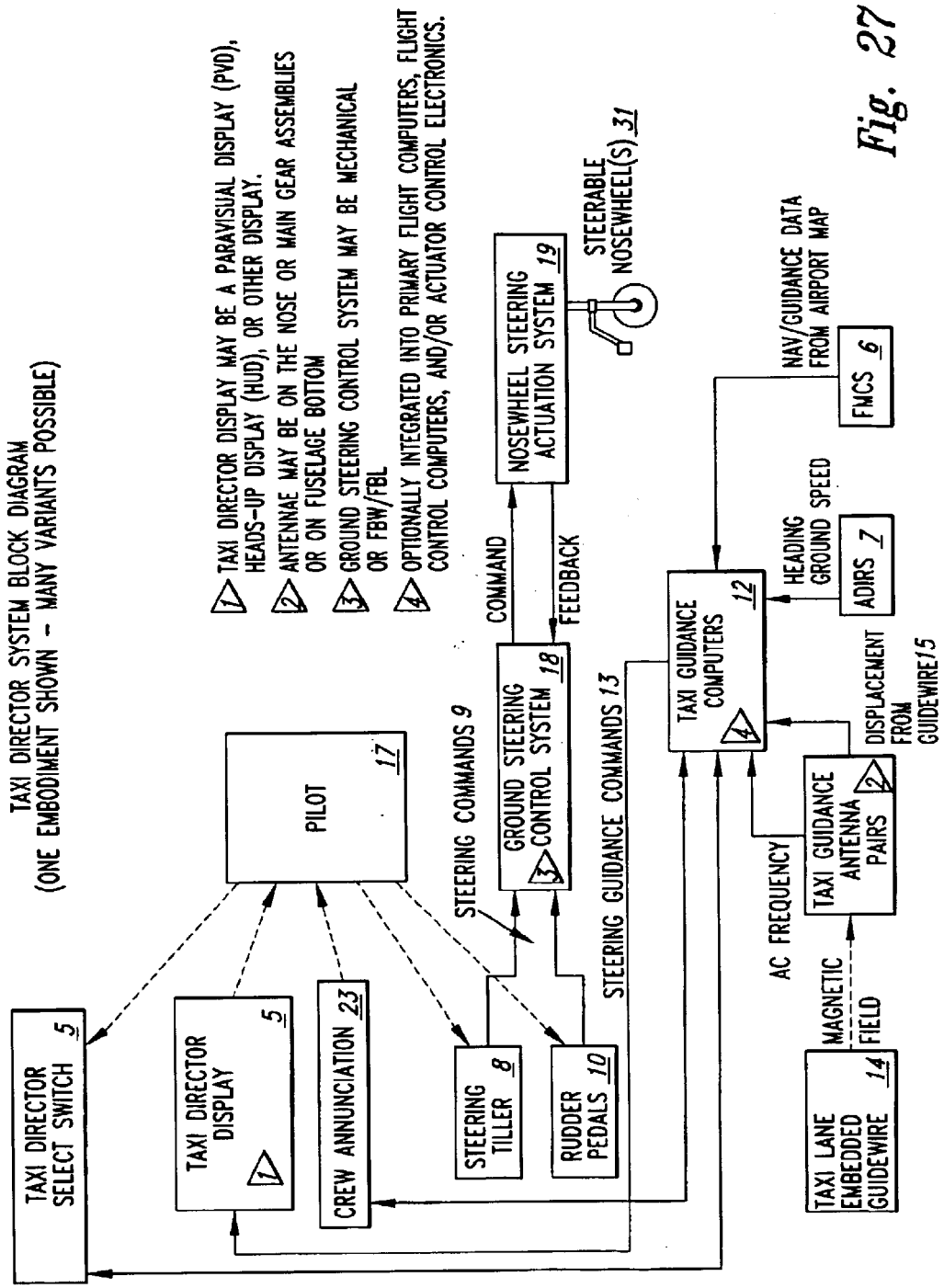

PILOTS TASK IS TO STEER (WITH TILLER AND
PEDAL CONTROL INPUTS) AND CONTROL SPEED (WITH
THROTTLE AND BRAKE INPUTS) IN SUCH MANNER
AS TO MAKE ACTUAL STEERING ANGLE AND GROUNDSPEED
FOLLOW THE TAXI DIRECTOR COMMAND BARS.

AUTOTILLER CONTROL SYSTEM FOR AIRCRAFT

FIELD OF THE INVENTION

This invention pertains to automatic guidance and control systems for aircraft moving on the ground.

BACKGROUND OF THE INVENTION

Deregulation of the airline industry has resulted in reduced airfares, which when combined with stable fuel prices, has further produced a volume of air travel that has been strongly and steadily increasing in the past decade. This trend is expected to continue unabated over the next two decades. However, airport support infrastructure, has not kept pace with increasing traffic volume, and is expected to lag further in the coming decades. Due to the limited numbers of airport gates, there is a strong motivation for airlines to move to larger aircraft to accommodate increased passenger volume through fewer gates. The need for larger aircraft is particularly critical at major "hub" airports in the "hub and spoke" systems operated by most large airlines in order to maximize passenger flow through their limited airport facilities.

Airlines experience significant logistical and operational problems trying to physically accommodate the increased wingspan, that which characterizes the new stretch derivative and super jumbo aircraft, in airport gates and taxiways designed for smaller aircraft. New aircraft designs are experiencing a modern trend towards increasing wingspan in view of the substantially improved aerodynamic efficiency and payload-range characteristics. The increased wingspan and/or length of larger aircraft will make parking such aircraft next to each other at gates more risky in terms of probability of collision, and will also increase problems related to ground services, arrangements, flows, and congestion. Similarly, the increased wingspan increases the probability of collisions between aircraft taxiing on adjacent taxiways/taxilanes or fixed objects. Finally, the modern trend towards greater aircraft densities operating in and around airports is necessitating greater aircraft maneuvering precision in the airport infrastructure.

Several prior logistical/operational approaches have been considered, which address the problems associated with fitting larger aircraft into airport facilities originally designed for smaller aircraft. One approach to maximizing passenger volume capability at a limited number of airport gates has been to park the largest possible aircraft type that will "fit" at each gate, given the constraining requirements of minimum clearances between the parked aircraft's wingtips and the wingtips of adjacent parked or parking aircraft and between the parked aircraft's aftmost extremity (e.g., tip of tail) and the "parking limit line" which separates the parking area from an adjacent active taxilane. This is a reasonable approach, but is inherently limited in the amount of additional passenger volume it can develop. Airline fleet mix, and more particularly the fleet mix present at each hub complex (i.e., the mix of aircraft actually present simultaneously at a gate constrained hub airport), can reduce the effectiveness of this strategy in increasing passenger volume. Airport terminals with movable (i.e.; apron-drive type) passenger boarding bridges can take advantage of this method to a considerably greater extent than can airport terminals with fixed boarding bridges, because movable bridges can be moved to effectively change the maximum aircraft size accommodatable at each gate.

A second approach has been to reduce the allowable operational clearances between parked aircraft and between a given aircraft and other fixed or moving objects (including other aircraft). An FAA Advisory Circular 150/5300-12 CHG 1, Mar. 14, 1985 specifies minimum clearances to be assumed for airport facilities design and expansion purposes. The specified clearance between a taxiing aircraft's wingtip and a nearest fixed-or-movable object is 32.5 ft. for Group IV airplanes (e.g., 767 or DC-10 class). The FAA does not regulate actual clearances used by airlines in their day-to-day commercial operations. Current airline practice includes examples of wingtip-to-wingtip clearances of as low as 17 ft. between adjacent parked aircraft. An obvious disadvantage of this second approach is that it increases the probability of collisions, and requires increased pilot attention and precision for the taxiing and parking tasks.

A third approach is to alternate large and small aircraft (747's and 737, A320, MD80's) at gates nominally designed for 767/DC-10 size aircraft. While this approach increases the size of the largest accommodatable aircraft, it has a disadvantage in that it may not significantly increase total passenger volume accommodatable. The realization that a combination of 5(qty.)-747's and 5(qty.)-737's may not result in significantly greater passenger volume than 10(qty.) DC-10's, illustrates this phenomenon.

A fourth approach goes beyond reducing allowable clearances between aircraft or alternating large and small aircraft, and instead takes into account the vertical separation between wingtips. For example, a DC-10 could be parked adjacent to a 727 with zero or even negative wingtip separation in a plan view, but with no real wing interference if the 727 wingtip passes under the DC-10 outer wing. Adequate vertical clearances have to be established accounting for the lowest possible ground clearance for the DC-10 wing and the highest possible wingtip location for the 727 (e.g., due to weight, gusts, etc.). However, this approach is disadvantaged in that it requires that airplanes with adequate vertical clearances be alternately parked, and therefore inherently limits gate assignment flexibility, and it aggravates problems of ground service vehicle access and parking.

A fifth approach has been to use angular aircraft parking in combination with carefully designed nonlinear (e.g., curved) taxi-in paths. This enables larger aircraft to park at gates designed for smaller aircraft, with the same level of wingtip-to-nearest-fixed-or-moving-object separations. While this approach is judged to be a viable for increasing the maximum aircraft size accommodatable and therefore total passenger volume accommodatable at space constrained airport gates, the amount of increased airplane wingspan is limited to about 5 to 10%. This approach is further disadvantaged when significant parking angles require modifications to be made to certain boarding bridges (e.g., fixed pedestal bridges) to increase the yaw swivel capability of the boarding bridge head to assure proper sealed mating of the bridge head with the aircraft door. U.S. Pat. No. 3,916,588: Integrated Industrial and Urban Airport Complex with Passenger and Freight Handling Facilities, & U.S. Pat. No. 4,218,034: Industrial and urban airport complex with Special cargo-handling facilities—Both teach an airport configurations that use angled aircraft parking to improve densities.

A sixth approach to increasing aircraft size accommodatable between adjacent parallel airport terminal piers is to replace dual, bidirectional wide-body aircraft taxilanes, with unequal width dual taxilanes, that are bidirectional for narrow-body aircraft (e.g., 737's and 757's) but are only unidirectional (i.e., effectively single lane) for increased span wide-body aircraft. However, this limitation could aggravate ground traffic congestion delays at major hub airports.

A seventh approach is taught by; U.S. Pat. No. 5,381,986 "Folding Wing-tip System"; which uses novel folding wingtips to allow large aircraft to be parked in space constrained gates and taxilanes. This clever approach although providing significant airport compatibility benefits, suffers from increased weight, complexity, and cost penalties to the host aircraft.

As will be apparent, variations and combinations of the above-mentioned approaches are also possible. All of the approaches cited above, except for approaches second and seventh, have the disadvantage of not allowing for increased airplane wingspan for dual bidirectional taxilanes between parallel terminal piers.

In addition to logistical and operational methodologies, a considerable amount of ground based, airport infrastructure airplane guidance hardware has been developed to assist the maneuvering of aircrafts around runways, taxilanes and terminal areas:

U.S. Pat. No. 6,362,750: Process and device for automatically supported guidance of aircraft to a parking position—A ground-based video-camera enabled system for providing guidance of aircraft to a parking position;

U.S. Pat. No. 6,324,489: Aircraft identification and docking guidance systems—A laser range finder enabled system for identifying an aircraft approaching a gate;

U.S. Pat. No. 6,282,488: Airport surface movement guidance and control system—A radar-based airport surface movement guidance and control system for display of positions and movements of aircraft, and vehicles around runways, taxiways, and aprons;

U.S. Pat. No. 6,100,964: Method and a system for guiding an aircraft to a docking station—An infrared sensor enabled system for providing detection and guidance of aircraft into parking gates;

U.S. Pat. No. 5,675,661: Aircraft docking system—An optical-laser based aircraft docking and external display system for providing pilots visual cues in response to sensed position;

U.S. Pat. No. 5,574,648: Airport control/management system using GNSS-based methods and equipment for the control of surface and airborne traffic—A GNSS & terrain map enabled system for controlling traffic wherein the aircraft utilize GNSS to calculate trajectory information and in turn communicate to a ground based monitor for updating a 3 dimensional terrain database;

U.S. Pat. No. 5,519,618: Airport surface safety logic—A computer system for tracking, detecting, predicting and management of potential aircraft collisions;

U.S. Pat. No. 5,375,058: Surface detection system for airports—Ground-based infrared scanners sense bar codes mounted on taxiing aircraft in conjunction with a ground-based aircraft position mapping and collision alert system;

U.S. Pat. No. 5,166,746: Aircraft docking guidance system which takes position reference in anti-collision light of aircraft—A CCD enabled aircraft docking system which senses the position of aircraft anti-collision lights and provides external guidance cues to pilots;

U.S. Pat. No. 4,995,102: Scanning method used by laser radar and laser radar for carrying out the method—A laser range finder enabled system for identifying and detecting the presence of aircraft and other traffic on an airfield;

U.S. Pat. No. 4,994,681: Device for detecting the position of a moving body, in particular an aircraft, in a plane—A laser source and camera detector enabled aircraft docking position sensor wherein laser reflections off an approaching aircraft are sensed for calculating position information;

U.S. Pat. No. 4,516,125: Method and apparatus for monitoring vehicle ground movement in the vicinity of an airport—A radar enabled apparatus for monitoring vehicle ground movement in the vicinity of an airport and involves the processing of radar return video signals;

U.S. Pat. No. 3,775,741: AIRCRAFT PARKING SYSTEM and U.S. Pat. No. 4,249,159: Aircraft docking system—These provide illuminator based docking-centerline deviation guidance that require reflective targets to be mounted to said aircraft;

U.S. Pat. No. 3,729,262: OPTICAL LENS DOCKING SYSTEM—An illuminator and lens based docking system so as to generate external visual cues comprising two bars of light that vary in their respective reference in accordance with the displacement of the aircraft.

U.S. Pat. No. 3,674,226: AIRCRAFT PARKING METHOD AND MEANS—A high intensity neon tube illuminator based docking system so as to generate external visual cues that demarcate aircraft parking alignment lines.

U.S. Pat. No. 3,821,697: VISUAL LANDING AND SURFACE GUIDANCE APPARATUS—A multi-illuminator based guidance system that operates similar in principle to an radio frequency (RF) Instrument Landing System (ILS) or Visual Approach Slope Indicator (VASI).

U.S. Pat. No. 4,184,655: Parking guidance system for aircraft—A ground-sensor based aircraft docking system wherein nose wheel position is sensed and displayed externally to pilots;

U.S. Pat. No. 4,015,235: Aircraft parking guidance indicator—A terminal-based optical positioning system for docking an aircraft wherein a positioning target and the phenomenon of optical parallax are used to indicate aircraft centerline deviation and correct stopping position in a parking gate;

Other ground-based systems have been developed that were characterized as providing a significant impact on the ground infrastructure, and are characterized as harnessing classic radio-frequency, electromagnetic or static principles:

U.S. Pat. No. 5,689,273: Aircraft surface navigation system—RF-based, ILS glideslope deviation indicator with taxilane based RF signal generator to provide taxilane centerline guidance;

U.S. Pat. No. 5,027,114: Ground guidance system for airplanes—An inductive loop coil enabled system for detecting aircrafts on taxiways wherein loop coils are buried in a specific section of a taxiway for sensing aircraft based on changes of self-inductances of the loop coils with movement of the airplane;

U.S. Pat. No. 3,662,977: Aircraft taxi guidance system; U.S. Pat. No. 2,574,490 Magnetic blind-landing system—Electro magnetic enabled systems for detecting aircraft taxi centerline deviation relying on buried conductors;

U.S. Pat. No. 3,431,996: Vehicle guidance system; U.S. Pat. No. 3,132,710: Vehicle ground guidance system; U.S. Pat. No. 2,044,852: Electric indicator for comparing field intensities; U.S. Pat. No. 1,968,068: Process and apparatus for measuring the phase difference of electric currents—Electrostatic enabled system systems relying on buried conductors.

Finally aircraft based systems:

U.S. Pat. No. 6,405,975: Airplane ground maneuvering camera system—An autonomous aircraft-based external camera system for aiding pilots in the ground maneuvering of an airplane;

U.S. Pat. No. 3,855,571: AIRCRAFT GROUND TRAFFIC CONTROL SYSTEM—Traffic control system wherein aircraft mounted sound emitters are tracked using taxiway mounted microphones and displayed on a controller's panel in the form of a map.

These systems have comprised a spectrum of technologies from relatively simple optical visual maneuvering cueing devices for pilots, to electro or radio enabled runway centerline deviation indicators; to radar enabled ground traffic situation indicators for terminal control area controllers. Few have been successfully adopted on a wide spread basis due to the costs, complexities of implementation, and unreliable performance in inclimate weather. All are characterised as primarily relying on the pilot to synthesize the correct response in reaction to guidance cues. Further, all are characterised as being a non-intergrated part of the normal pilot-aircraft operational enviroment. What is needed is an aircraft "autotaxi" or "autotiller" system that is integrated into, and makes use of, the recent advances in aircraft systems and airport traffic management technologies.

SUMMARY OF THE INVENTION

This invention enables increased size (e.g., span and length) airplanes to operate in space constrained airport gates and taxilanes, without the disadvantages associated with prior art approaches, through use of an "autotiller" concept. The autotiller concept can be used in conjunction with the prior art approaches to yield potential additional airport compatibility advantages. The invention is intended to enable increased span configurations to be compatible with airport gate and taxilane facilities sized for smaller size and span aircraft. The invention also maximizes the precision of the host aircraft maneuvering, and therefore the realization of safety and efficiency advantages. The "autotiller" provides a method of automatically and precisely controlling nosewheel steering so as to keep the nosewheel very close to (e.g., within about plus or minus one foot of) the desired nosewheel taxiline as the aircraft taxis through "tight" taxilanes, and in and possibly out of its parking position. A precise means for sensing or computing nosewheel lateral deviation from the nosewheel taxiline are one approach to implementing the autotiller system. An example of such means uses a taxilane installed guidewire and airplane installed inductive sensors to support the autotiller steering control system. Other methods of precisely sensing/computing aircraft position/orientation to support the autotiller function include use of inertial reference equipment, ground or air based satellite or pseudo-satellite positioning systems such as GPS, optical, or radio frequency, and onground sensors such as contact, pneumatic wheel passage sensors, electroc-static, electromagnetic, radio frequency or odometry, and or any combination thereof. Modern aircraft systems frequently utilize sensors from a plurality of suitable choices depending on costs, availability, and redundancy requirements. Lateral position sensing/computing can be combined with longitudinal position sensing/computing, and the automatic nosewheel steering can optionally be combined with automatic thrust and automatic braking control for on-ground taxi operations. Means are provided for smooth switching from one taxi path to another (e.g, when turning from one taxilane to another); and emergency automatic collision avoidance sensing, steering and braking means may optionally be provided. Autotiller steering will preferably be automatic with parallel tiller operation and pilot override capability. Autotiller system operational failure status will preferably be annunciated to the flight crew.

An alternate embodiment of the autotiller is referred to as a "taxi director", wherein the autotiller commands do not drive the nosewheel steering directly but instead produce guidance commands which are displayed to the pilot, who executes or follows these commands through operation of tiller steering. The "taxi director" provides a method of precisely guiding the pilot, by producing steering commands for the purpose of controlling nosewheel steering so as to keep the nosewheel very close to (e.g., within about ±2') of the desired nosewheel taxiline. In a preferred mode of carrying out the invention, the taxi director drives a guidance display visible to the pilot even while the pilot is looking out of his forward windows (i.e., pilot is "head up"). For example, sensed lateral deviation from the desired taxi line can drive a paravisual display (PVD) similar to the optional PVD's used for directional guidance along the runway centerline for low visibility takeoffs on 747–400's. Alternately, directional guidance commands can be displayed to the pilot on a heads-up display (HUD) or the pilots's forward panel cockpit primary flight displays (PFD). The pilot can use PVD/HUD/PFD guidance information to taxi precisely along the desired taxi lane, or precisely with an optimal oversteer amount for turns between taxiways or taxi lanes. By providing precise steering guidance to keep the aircraft on its desired taxi lane with a high repeatability, widespread use of the invention will enable the reduction of safely allowable taxiing aircraft wingtip to nearest fixed or movable object clearances.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein:

[FIG. 16 "optical target"]

FIG. 27 shows a block diagram of a taxi director variant of the autotiller control system.

DETAILED DESCRIPTION OF THE PREFERRED EMBODIMENT

Figure 1:
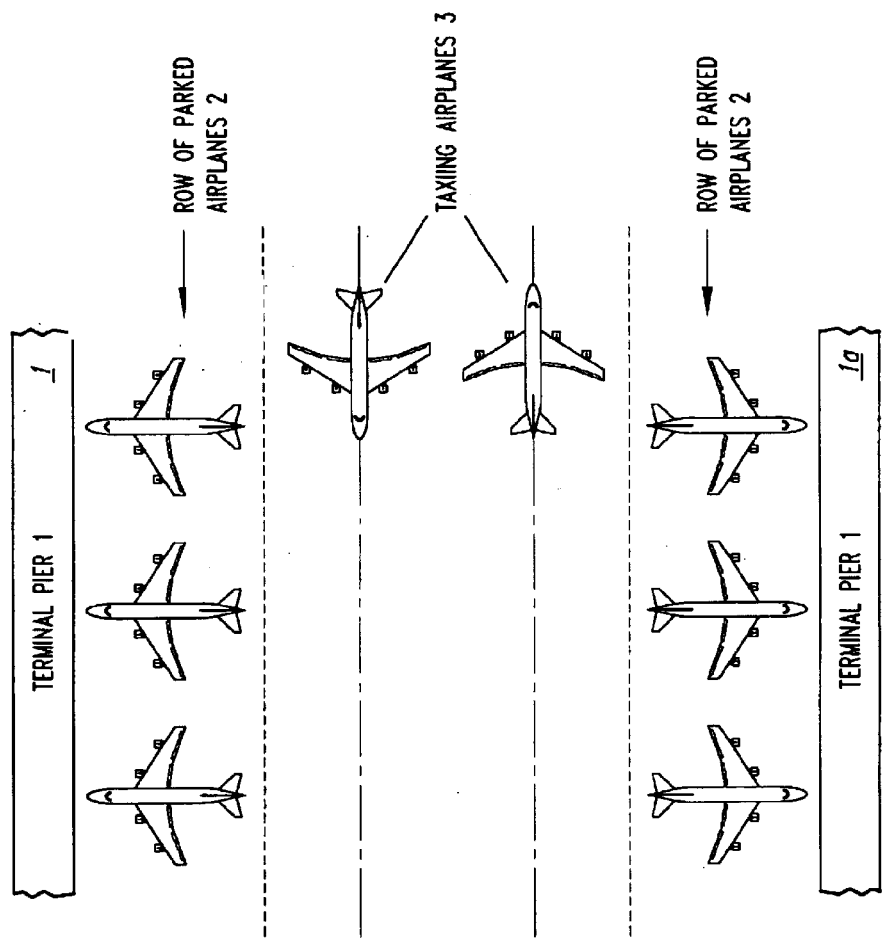
FIGS. 1 and 2 show examples of airplane taxiing and parking at a representative airport, without and with autotiller nosewheel steering control.
Figure 2:
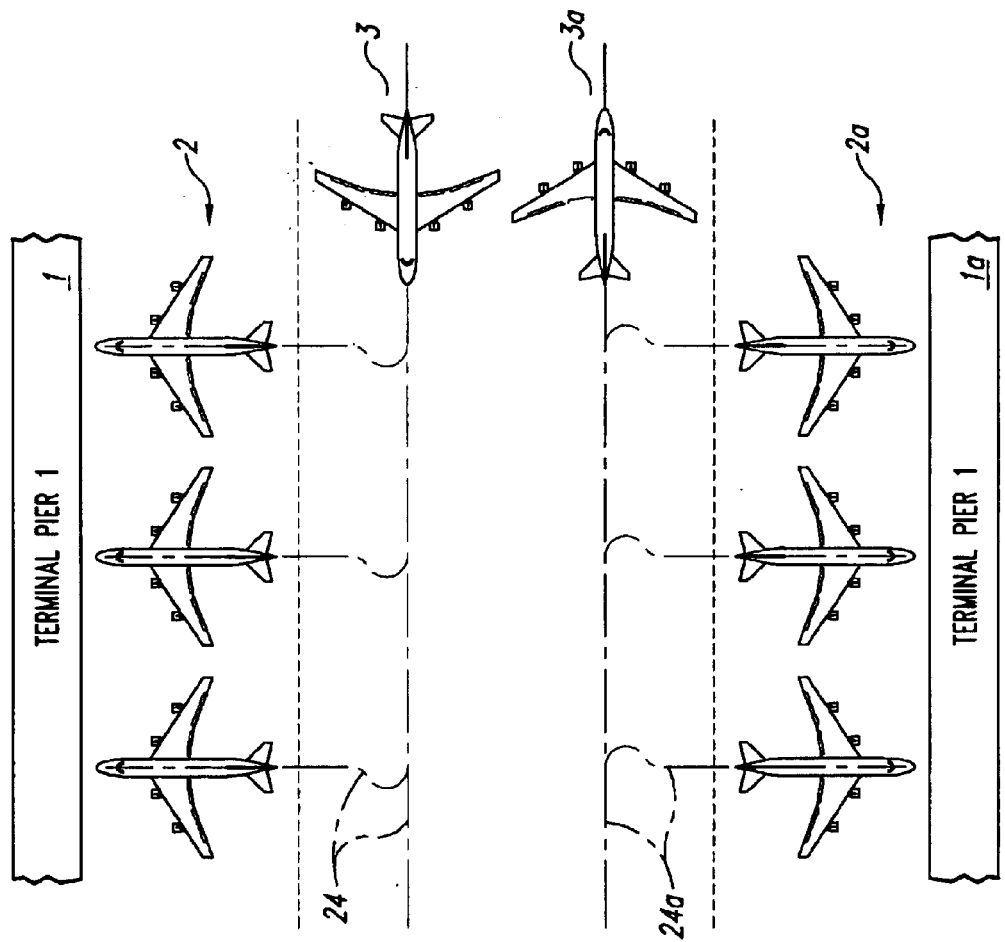

FIGS. 1 and 2 illustrate application of the autotiller concept to a representative airport situation. FIG. 1 shows a typical airport situation, with two terminal piers 1 flanking a paved area accommodating two rows of parked airplanes 2 and dual taxilanes for permitting two taxiing airplanes 3 to pass each other without having to stop or swerve to avoid risking wingtip collision. Typical operational separations are nose-to-terminal face clearance of 20', moving wingtip-to-parked airplane tail clearance of 30', moving wingtip-to-moving wingtip clearance of 35', and parked wingtip-to-parked wingtip clearance of 25'. Depending on the airport, airplane size, class, and airline particulars, these clearance criteria are varied somewhat.

FIG. 2 shows a similar airport scenario, with larger autotiller equipped parked airplanes 2A and taxiing airplanes 3A in the same facilities designed for smaller non-autotiller equipped airplanes. The above-mentioned clearances can now be reduced relative to the baseline values for clearances without increasing the risk of airplane collision with other parked or moving airplanes or with fixed objects such as the terminal pier buildings 1 or boarding bridges attached thereto. The autotiller provides automatic means for steering autotiller equipped aircraft very precisely along specified nosewheel guide paths. The very precise steering control will greatly reduce the probability of significant lateral excursions from the designated guidepath, and so permit lateral clearances to be reduced without increasing collision probabilities.

In a typical embodiment, the precise airplane location information needed to support the autotiller guidance function will be provided by aircraft sensing of its lateral displacement relative to guidewires 24 which are embedded in the pavement along possible desired nosewheel guidepaths, as illustrated. The turn-in-to-part guidepath incorporates the equivalent of judgmental oversteering used by pilots to improve turning clearances for large aircraft. It should be noted that the particular airport layout and airplane parking and taxiing arrangement shown in FIGS. 1 and 2 are only one example of a large variety of possible applications of the autotiller concept to improve airport compatibility of airplanes. The autotiller concept can also be used in conjunction with the prior art operational methods and hardware discussed in the Background of the Invention section above, to yield potential additional airport compatibility advantages.

Figure 3:
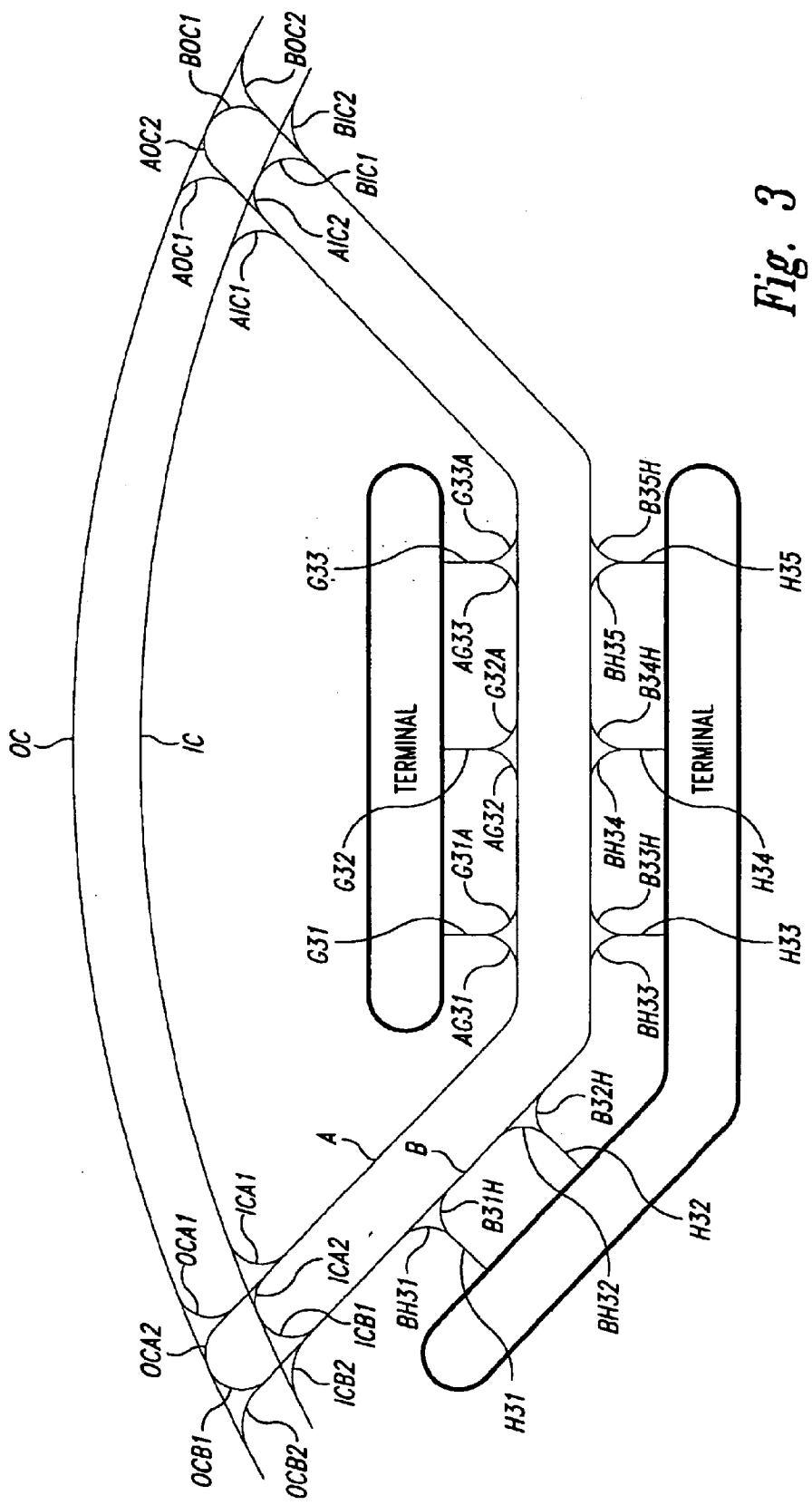
FIG. 3 shows a representative airport and guidepath layout database to support an autotiller system.

FIG. 3 shows a typical airport layout and autotiller guidepath database showing the, multiple guidepaths, merges and forks which would likely characterize an operational autotiller control application. Such a database would typically be stored in a flight management computer electronic library system or other data storage system on board the aircraft. The database would typically store airport and guidepath layout information for several airports, AIRPORT-1 through AIRPORT-N. Particular guidepaths at each airport will preferably be uniquely labels, e.g., with the illustrated labels OC, OCA1, OCA2, A, AG31, etc.

Figures 4, 5:
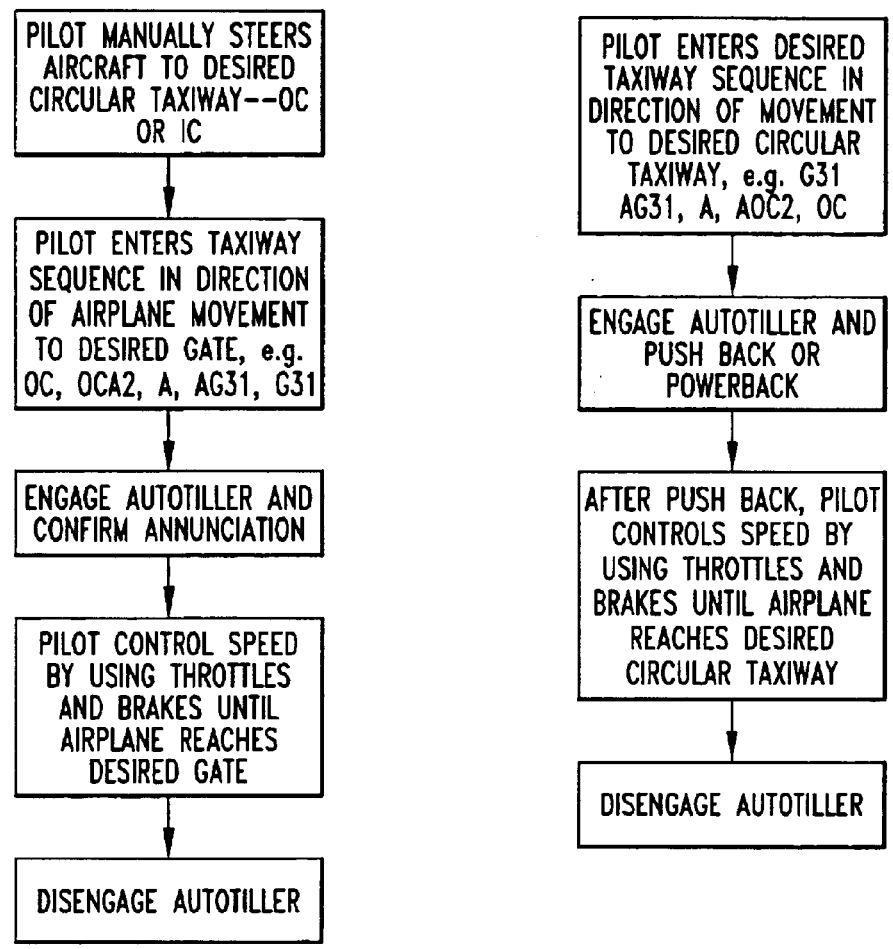
FIGS. 4 and 5 show typical taxi-in and taxi-out sequences for the guidepath layout shown in FIG. 3.

FIG. 4 is a representative example of one sequence of steps that a pilot could execute when taxiing in his aircraft at AIRPORT-1, using an autotiller control system. The pilot enters a desired guidepath sequence to the autotiller computer using an interface device such as a keyboard, cursor control, multifunction control display unit (MCDU) or suitable voice recognition enabled data entry interface. The pilot engages the autotiller at an appropriate time (on the outer circular taxiway in this example, and thence the autotiller automatically steers the aircraft to the gate. Speed control, through the use of throttles and brakes, can be accomplished either by the autotiller in conjunction with the autothrottle and or autobrake avionics, or manually by the pilot. In accord with normal aircraft operation design, the pilot retains emergency/discretionary braking and steering override capability at all times.

FIG. 5 is a representative example of one sequence of steps a pilot could execute when leaving an airport gate while using the autotiller function. In the gate-leaving sequence wherein a tow tractor is used to push or pull back the aircraft, a data communication means may be provided for the airplane installed autotiller system to communicate desired nosegear path and other data to the tow tractor, to enable the tow tractor to correctly push back the aircraft along the desired pushback guidepath. The tow tractor's all-wheel steering may be automatic, or may be controlled by the tractor driver following guidance commands based on the autotiller supplied data from the aircraft. By using autotiller for taxiing to the gate and push-back from the gate, it may be possible to reduce allowable wingtip-to-wingtip clearances between adjacent parked airplanes, and hence increase the number of aircraft that can park per given amount of terminal frontage.

Two key factors needed to achieve precise autotiller taxiing control are precise nosewheel steering control and precise real-time airplane location and orientation information. Precise nosewheel steering control can be provided on most aircraft using either mechanical or "fly-by-wire" control means. Most larger commercial transport aircraft utilize hydraulically powered nosewheel steering for pilot and autopilot rollout guidance and directional control on-ground. It is understood that modern nosewheel steering designs are of sufficient precision to be adequate for the autotiller taxi control function on many aircraft types.

An essential requisite for autotiller control is the need to know precisely where the aircraft is located in the airport taxiway/parking apron area. Current or projected inertial navigation equipment, (inertial reference system (IRS), air data inertial reference system (ADIRS), satellite based global positioning satellite system (GPS) or ground based satellite positioning system (pseudo satellite) or hybrids thereof (Differential Global Positioning satellite systems), may or may not provide location information to the level of precision needed (e.g., ±1' standard deviation) for autotiller taxiing. However, with the addition of some ground-based location finding/guidance equipment the level of precision required can be achieved.

Examples of some ground-based location finding/guidance techniques found in the prior art and briefly discussed in the "background of the invention" include the following: Mechanical guidepaths (e.g;, rails); Inductive paths (e.g.; embedded AC wire); Magnetic sensors; Laser beacons; Optical sensors/imaging systems; Inertial navigation; Dead reckoning; Odometry, and combinations thereof. Techniques found in the analogous arts pertaining to automated guided vehicles (AGVs) may also be used. Automatic guidance has been demonstrated for buses/trucks (Ref 6) using inductive guidepath sensing and feedback steering control. General Motors has conducted a study on an Automated Highway System (AHS, References 2–5) for automatically controlled automobiles. The GM study considered both inductive guidepath (e.g., wire-in-ground) and physical guidepath (e.g., guidewall sensed by vehicle on-board side-looking radar) guidance systems.

Figure 6:
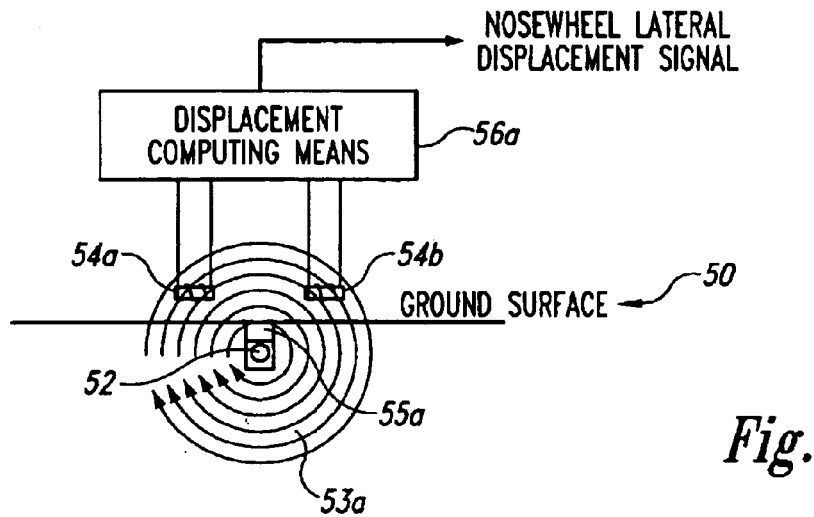
FIGS. 6 and 7 show inductive methods of sensing airplane lateral position on the ground relative to a ground installed guidewire.
Figure 7:
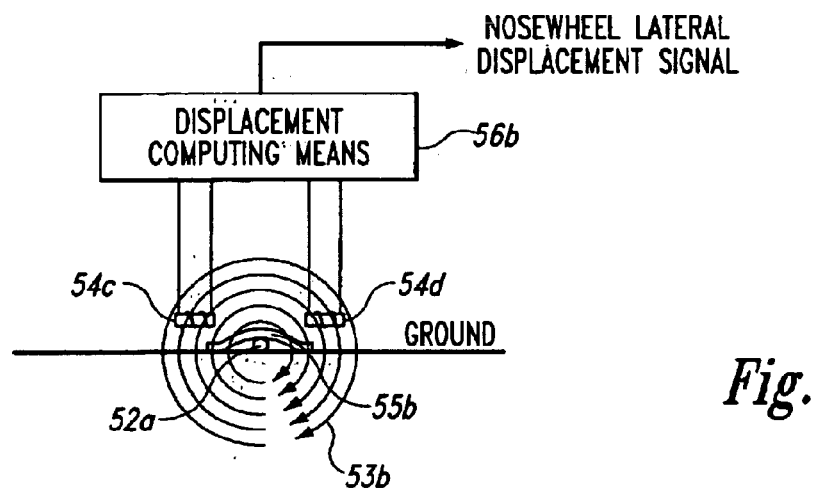

While many of the above discussed or other methods could be used for position information generation, some preferred methods will be presented in greater detail for application to autotiller airplane control. The first preferred method assumes use of the proven wire-in-ground inductive guidepath method. The basic concept of this method is illustrated in FIGS. 6 and 7. In this method, a guidwire 52 is embedded in the ground surface 50 along the desired airplane nosewheel guidepath, typically in a saw cut in the pavement and covered with a guidewire cut surface filler 55. The guidewire 52 carries an AC current and thereby generates an AC pulsating magnetic field 53. Antenna coil 54A and second antenna coil 54B, installed preferably in the nosewheel support structure of the autotiller equipped airplane, together enable sensing of airplane nosegear lateral position with respect to the AC pulsating magnetic field, and therefore with respect to the nosewheel guideline. Lateral displacement of the antenna coils 54A and 54B relative to the magnetic field 53A will generate differential signals in these two coils, which can be combined by displacement computing apparatus 56A to synthesize a nosewheel lateral displacement signal. The guidewire may optionally be installed with a fixed lateral offset relative to the nosewheel guideline. Multiple laterally offset guidewires may optionally be used. As illustrated in FIG. 7, the guidewire 52B may also be optionally installed above the ground surface, with a protective tape or sealer 55B to enable aircraft wheels, snowplow blades, and other objects to move over the guidewire without damaging the guidewire. Again, multiple guidewires may optionally be used.

Figure 8:
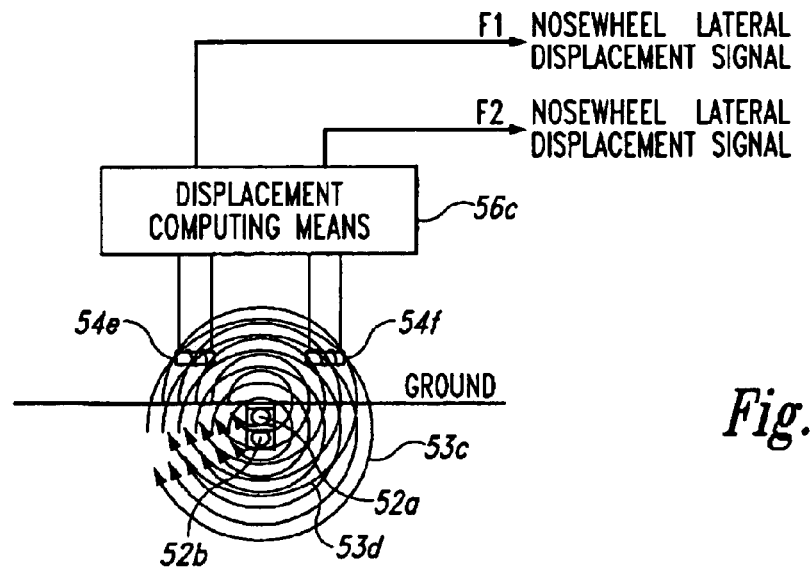
FIG. 8 shows an inductive method of following one guidewire and then switching to another guidewire.

FIG. 8 shows a guidewire system as shown in FIG. 6, used in the vicinity of a "fork" or "merge" in guidepaths, as for instance where guidepath AOC2 "merges" with guidepath OC in FIG. 3. In the area of the merge, two guidewires run together, separated by some spacially adjacent orientation. In FIG. 8, the autotiller system is guiding the airplane along a first guidewire, either 52A or 52B, along a guidepath such as AOC2 shown in FIG. 3, but will switch next to guidewire OC based on the guidepath sequence, as for instance the taxi-out sequence shown in FIG. 5. The nosegear mounted coils 54E and 54F, sense that AC magnetic fields 53C and 53D, from both guidewires 52A and 52B, which are distinguishable by having different frequencies. The autotillers frequency separation and displacement computing apparatus 56C serves as displacement computing means for computing nosegear lateral displacement relative to both guidewires, and enables the autotiller controller to smoothly transition from following the initial guidewire AOC2 to following the final guidewire OC, reference in FIG. 3.

Figure 9:
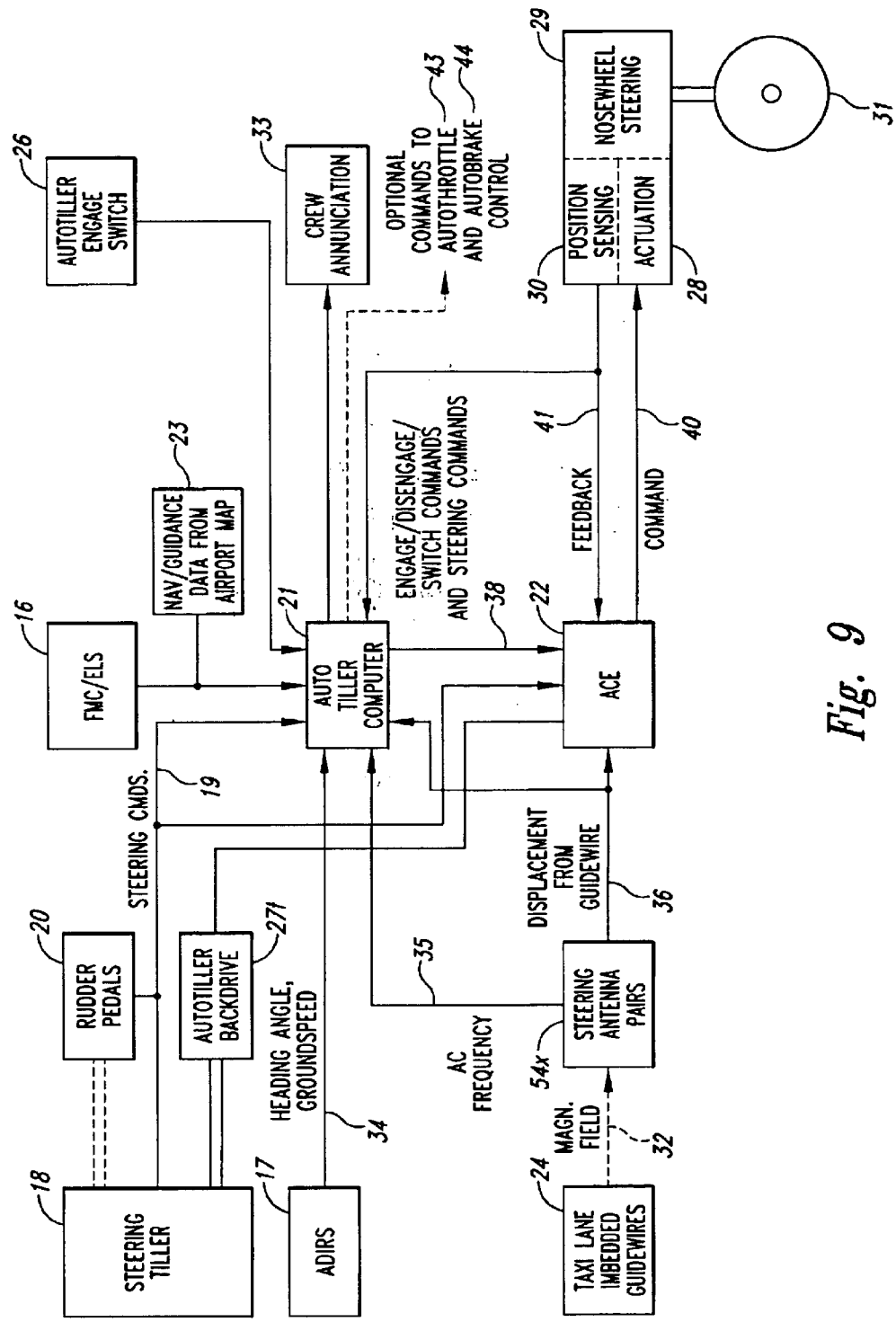
FIG. 9 shows an embodiment of an overall autotiller nosewheel control system.

FIG. 9 shows a system block diagram for an autotiller system using the inductive guidepath embodiment. While the embodiment shown utilizes a fly-by-wire/fly-by-light (FBW/FBL) nosewheel steering control system, variant embodiments could use series or parallel servos to drive a mechanical nosewheel control system, that which characterises older aircraft designs. In the exemplary architecture shown, an actuator control electronic unit (ACE) 22 performs the simple inner loop guidewire following steering function, while Autotiller Computer 21 performs autotiller engage/disengage, lane switching, incremental steering, and crew display and annunciation functions. Multiply redundant autotiller computers, and other components and subsystems may be provided to improve fault tolerance through redundancy. Details of the algorithms which will be implemented in the autotiller computers will be discussed subsequently. The autotiller computer 21 and ACE 22 could optionally be combined with each other or integrated into another type of airplane on-board computer such as autopilot, flight control computers or flight management computers (FMC).

The operation of the exemplary embodiment shown in FIG. 9 can be described as follows. Further details are provided with reference to subsequent figures. The pilot can make ground steering command inputs with either foot operated rudder pedals 20 or a hand operated steering tiller 18. The copilot can also make steering inputs with his rudder pedals, and with a steering tiller if provided. The steering tiller 18 provides a pilot hand operable steering control input device for making directional control inputs. The positions of the rudder pedal 20 and steering tiller 18 are interpreted by the ACE 22 as steering commands 19. Large steering authority rudder pedal commands or a large steering authority wheel controller commands (e.g., with the roll controller transitioning to a directional control function at taxi speeds) may be used in conjunction with the autotiller function, as alternatives to the tiller controller 18.

When in the normal manual ground steering mode, characterized as having autotiller disengaged, the ACE 22 controls at least one nosewheel steering actuator 28 in such manner as to cause the nosewheel 31 to steer to an angle which follows the steering command 19. The ACE 22 accomplishes this function by generating a feedforward command 40 to a nosewheel actuation subsystem 28 which drives the nosewheel steering 29. Actual nosewheel steering position signal 41 is feedback from a position sensing transducer 30 to the ACE 22. A nosewheel position error signal is computed from the difference between commanded 40 nosewheel position and actual nosewheel position 41. Optionally, the ACE 22 can modify the feedforward command 40 to minimize the position error. The described ACE nosewheel steering command method serves as a nosewheel steering control means for positioning the nosewheel steering so as to follow the nosewheel steering angle command from the manual steering command generation means when automatic ground steering is disengaged.

When the pilot engages autotiller operation using an autotiller engage switch 26, and when the following conditions are met, the autotiller computer 21 transmits a command 38 to the ACE commanding start of autotiller operation. The autotiller computers also provide crew annunciation 33 of the start of autotiller operation at this time.

Conditions: Airplane on-ground, speed < 40 knots or in "taxi-rollout mode"
Heading angle, groundseed at 34 available from ADIRS 17

-continued

Navigation/guidance data 23 from airport map available from FMC (Flight management computer) 16/ELS (electronic library system) or other source
Displacement from guidewire 36 available from steering antenna pairs 25
No pilot override steering inputs are received The conditions listed above are exemplary—however, alternate conditions may be used within the scope of the invention.

Crew annunciation 33 will also be provided when the autotiller function is unable to maintain precise tracking (i.e., if displacement from guidewire 36 exceeds a threshold value for more than some threshold duration). For example, this could occur if nosewheel steering authority limits are reached, or if nosewheel steering loses traction, or if the autotiller steering control system fails, or if malfunctions in some way, or if taxi-centerline sensing system envisioned in alternate embodiments fail or are unable to perform their intended function due to inclimate weather.

When the ACE 22 starts the autotiller control mode, it uses a "drive-error-to-zero" feedback control law to command nosewheel steering in such manner as to drive a displacement from a guidewire signal towards zero. The feedback control law will be described subsequently in further detail, with reference to FIGS. 22 and 23A–B. The displacement from a guidewire is measured by airplane installed steering antenna pairs 54A–54F which measure the airplane's lateral displacement or deviation 36 relative to taxilane embedded guidewires 24, using the inductive principle shown in FIGS. 6–8. The steering antenna pairs 54A–54F provide a means for estimating lateral displacement of the aircraft from a desired nosewheel taxi line. The feedback control law provides automatic steering command generation means for generating a nosewheel steering angle command which tends to zero the lateral displacement. Feedback control laws will be subsequently discussed in further detail with reference to FIGS. 22 and 23A-B. The net effect is that the airplane automatically steers to precisely follow the taxilane embedded guidewire, with no steering inputs from the pilot. The method of ACE 22 control of the nosewheel steering 21 described in the former paragrph also serves as nosewheel steering control means for positioning the nosewheel steering so as to follow the nosewheel steering angle command from the automatic steering command generation means when automatic ground steering is engaged. In the exemplary embodiment under discussion, the pilot still manually controls thrust and braking. However, the autotiller computers may issue optional throttle commands 43 and braking commands 44 to the autothrottle system and an automatic braking control system, for execution by the latter systems. For example, commands may be issued to maintain constant taxi speed or to follow a taxi speed schedule based on where the airplane is taxiing, turn curvature, or in response to a ground traffic control management. Pilots have ultimate braking control override authority over the system to preserve his traditional role as having ultimate responsibility for the control and safety of his aircraft. Further, optionally, a collision detection, alert and override system could be used to provide additional safety inputs to the systems, in consideration of high pilot workload enviroments, conjested operational enviroments, or operation in low visability inclimate weather conditions. This feature will be discussed further with reference to FIG. 11.

As already discussed with reference to FIG. 8, when the aircraft comes to a "fork" in a tax ilane it is following, the autotiller computer informs the ACE which guidewire it should follow (via command path 38), based on navigation/guidance data received by the autotiller computer from the flight management computer (FMC) or airport map database. Forks in guidewires are preferably implemented by using guidewires with different AC frequency 35 or otherwise distinguishable signals. Spatially adjacent overlapping guidewires may be used at wire junctions at guidepath forks.

To provide "parallel" autotiller operation, an autotiller backdrive 27T using at least one backdrive servoactuator is preferably installed. This feature will be discussed further with reference to FIG. 10.

Figure 10:
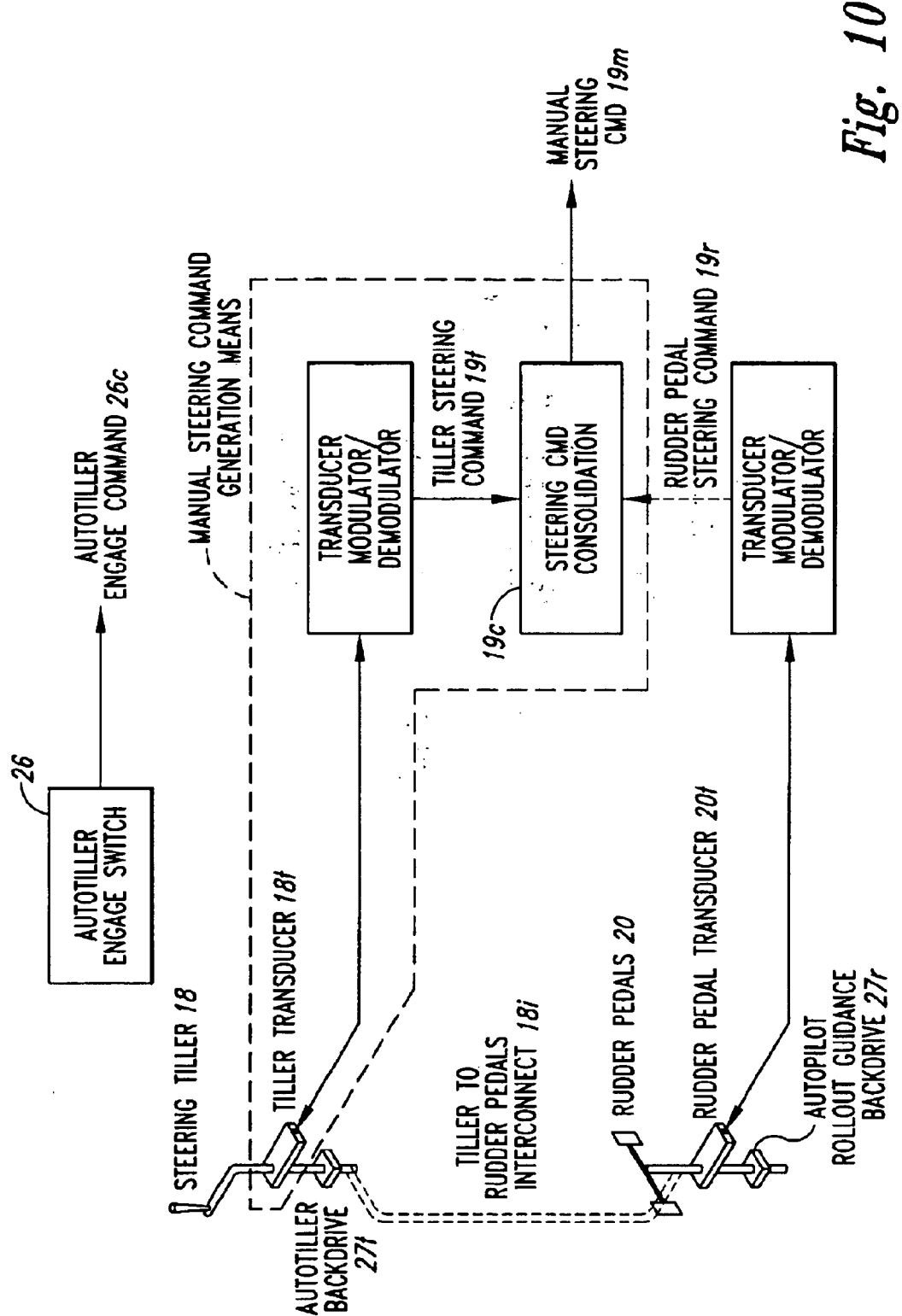
FIG. 10 shows a pilot controller to manual steering command generation control path.

FIG. 10 contains additional detail on the pilot command interface with autotiller function. The positions of the pilot operable rudder pedal 20 and steering tiller 18 are measured by a rudder pedal transducer 20T and a tiller transducer 18T, respectively. Transducer modulator/demodulator units connected to the transducers demodulate signals received from the transducers to generate tiller and rudder pedal steering commands 19T and 19R; respectively. A steering command consolidation block 19C consolidates the tiller and rudder pedal steering commands 19T and 19R, and generates a manual steering command 19M. The tiller transducer 18T, tiller transducer modulator/demodulator, and steering command consolidation block together provide manual steering command generation means for generating a manual (nosewheel) steering angle command 19 from the hand operable steering control input device or "tiller" 18.

The rudder pedals and steering tiller may be mechanically tied together for small tiller deflections, to prevent command discrepancies between the two input devices. In FIG. 10, this mechanical tie is shown as the tiller to rudder pedals interconnect 181. Even if the tiller and rudder pedals are not mechanically tied together, their commands may still be electronically combined by a steering command consolidation function such as the steering command consolidation block 19C. In either case, even after full rudder pedal deflection authority is achieved, the steering tiller can still be rotated further to generate additional steering authority (e.g., >20 degrees) corresponding to the large steering authority of the tiller controller for manual steering control.

To provide "parallel" autotiller operation, an autotiller backdrive 27T using at least one backdrive servoactuator is preferably installed. The tiller backdrive is conceptually similar to the conventional autopilot rollout guidance backdrive 27R provided for the rudder pedals. The autotiller backdrive 27T serves for positioning the hand operable steering control input device 18 when automatic ground steering is engaged, in such manner so as to provide the pilots with a visual and tactile cue commensurate with normal tiller-to-nosewheel position and orientation as when in manual control mode. This is important in recognition that the in the event of an automatic control mode disconnect, that manual that the position could seemlessly resume without re-indexing the tiller-to-nosewheel position control.

Another pilot interface shown in FIG. 10 is the use of the pilot operable autotiller engage switch 25 to generate an autotiller "ARM" and "ENGAGE".

While the tiller and rudder pedal interfaces for the autotiller function are shown in FIG. 10 for a single pilot, it should be clear that the implementation can be extended to the case of a two-pilot flight deck, with the tillers (if the copilot has one) and rudder pedals of the two pilots preferably being mechanically and/or electronically linked.

Figure 11:
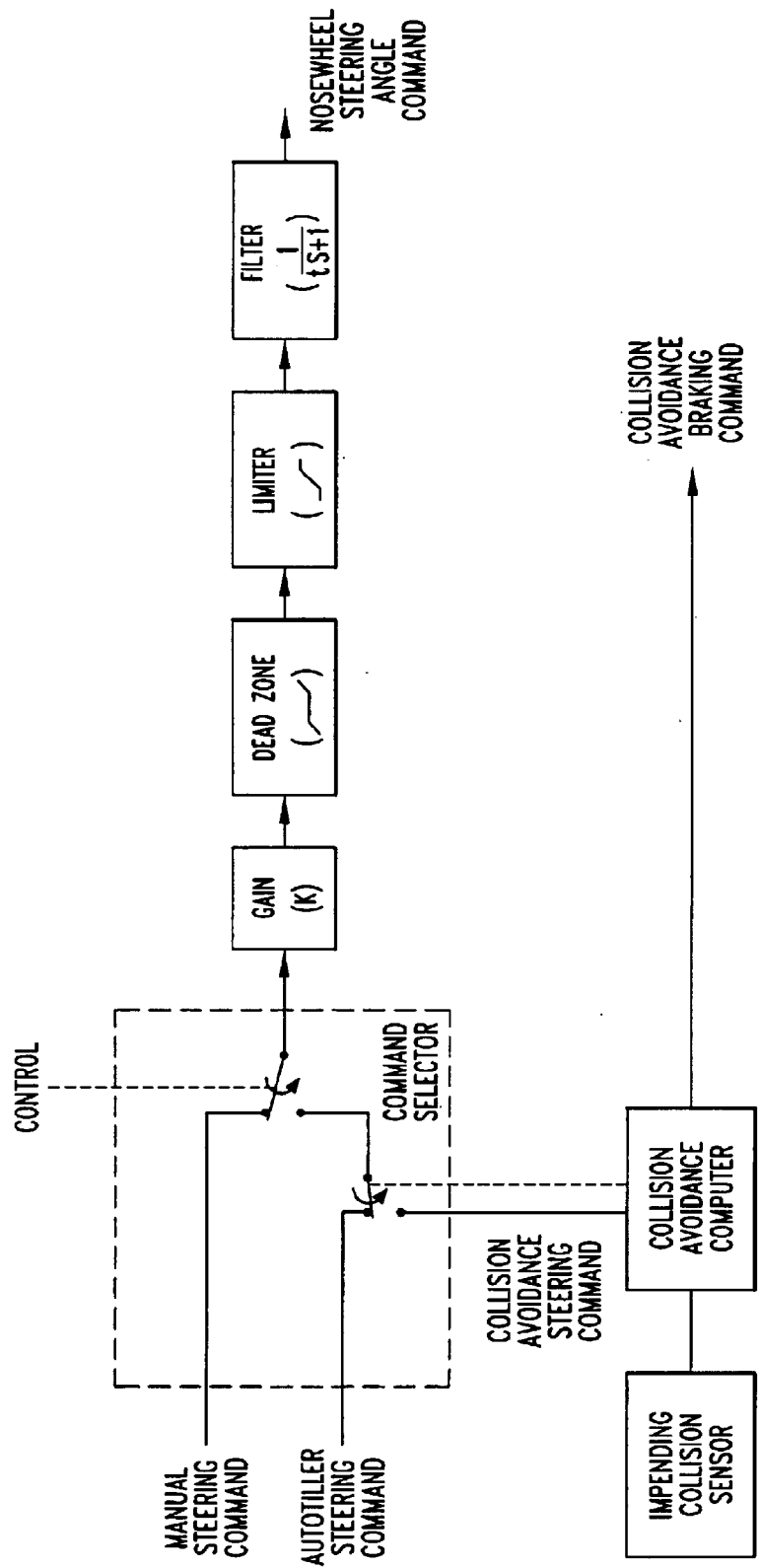
FIG. 11 shows computer means comprising a representative algorithm for generating a nosewheel steering command.

FIG. 11 shows a computer for generating nosewheel steering commands, using manual, automatic, and collision avoidance steering commands as inputs. Manual, automatic, and collision avoidance steering commands feed into a command selector, which outputs a single consolidated command, which in turn passes through optional gain, deadzone, position and/or rate limit, and filter elements to generate a final nosewheel steering angle command. In a typical command selector logic, steering command is selected if automatic ground steering (i.e., autotiller) is engaged and no impending collision is detected. If automatic ground steering (i.e., autotiller) is engaged and an impending collision is detected, then collision avoidance steering command is selected. If automatic ground steering (i.e, autotiller) is disengaged or if the pilot's manual steering command differs from the automatic or collision avoidance steering command (whichever is operational) for more than a certain threshold value for more than a certain time delay, then the manual steering command is selected. Note that when automatic or collision avoidance steering commands are selected, the manual steering commands (though not selected) will still track the selected command because of the "parallel" autotiller operation implemented through the autotiller backdrive.

The collision avoidance steering command comes from a collision avoidance computer, which in turn uses data from one or more impending collision sensors. The collision avoidance computer may optionally be part of the autotiller computer or other computer. For example, an impending collision sensor could comprise a radar, laser or acoustic sonar type sensor. The collision avoidance computation block may also generate a collision avoidance braking command which feeds to the automatic braking means, such as an autobrake system.

Figure 12:
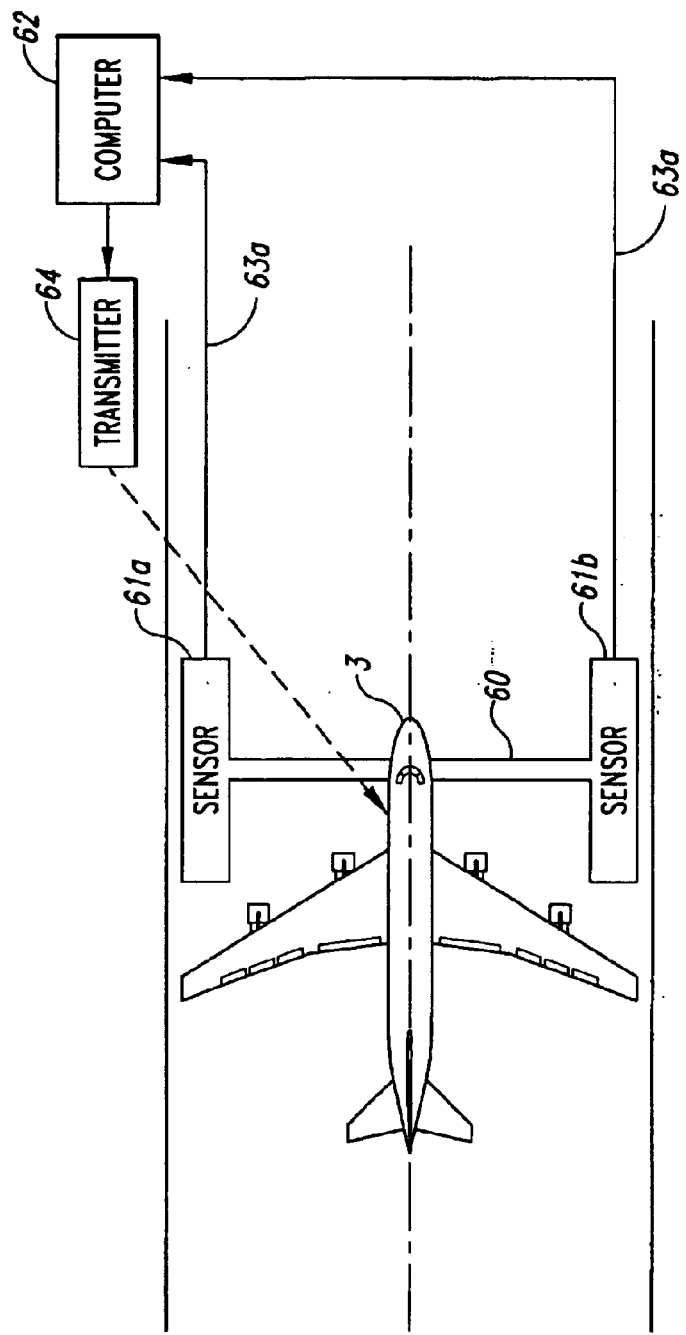
FIGS. 12 and 13 show pneumatic fixing plus odometric and dead reckoning methods of sensing/computing airplane position on the ground.
Figure 13:
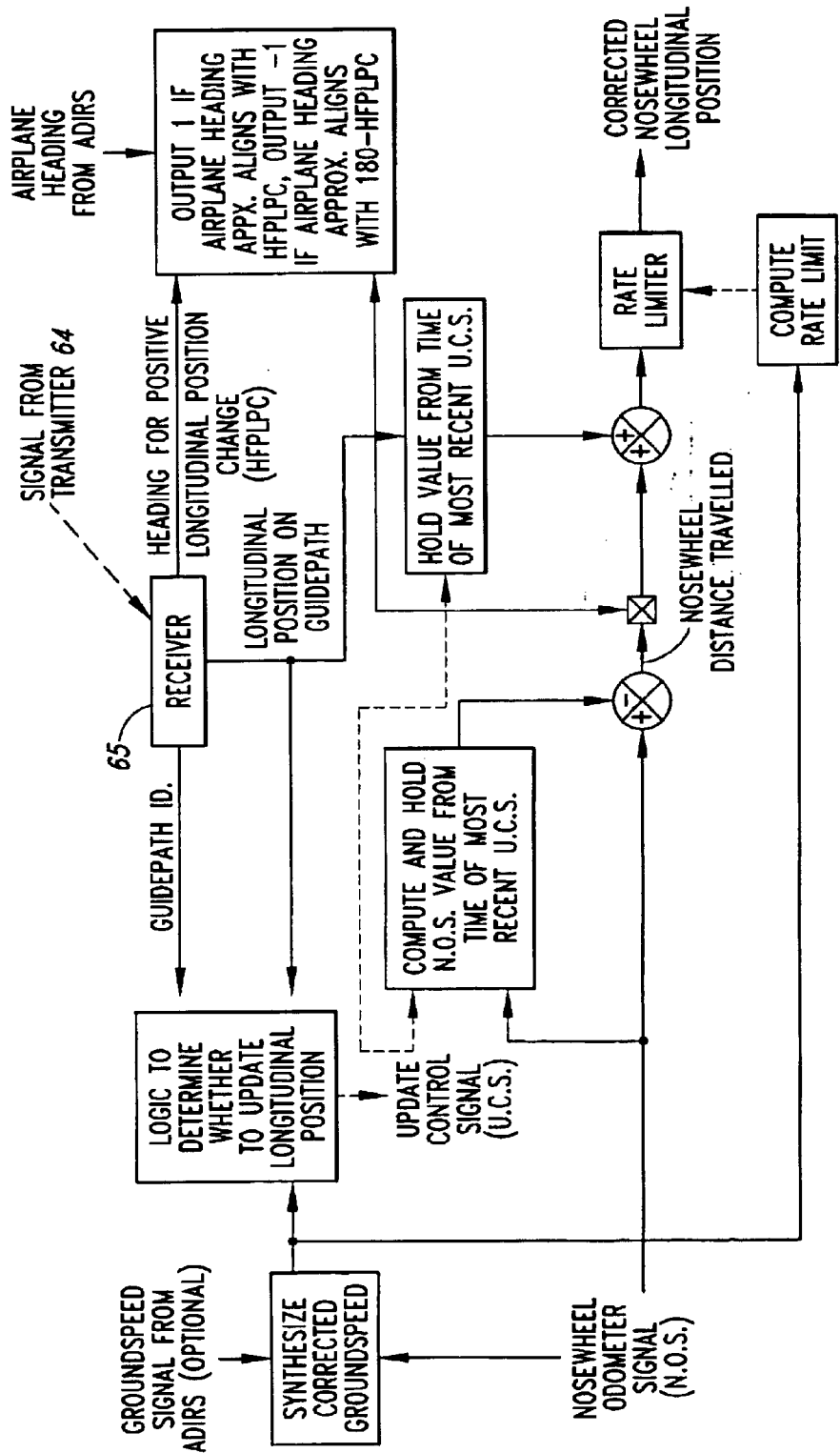

FIGS. 12 and 13 show a position-fixing plus odometric method of sensing airplane longitudinal position along a guidepath on the ground. Airplane lateral position relative to a guidepath is determined by guidewire sensing as described with reference to FIGS. 6–9. The following describes one preferred method of sensing and updating longitudinal position along the guidepath, to obtain a precise longitudinal position as opposed to using strictly an inertial or odometric position estimating system. A taxiing airplane 3 drives over a sensor which can detect passage of the nosegear over it. For example, the sensor could comprise a pneumatic line 60 connected to one or more pneumatic sensor(s) 61a, 61b located at or near the side(s) of the taxilane/taxiway being used by the taxiing airplane. The passage of the airplane nosewheel over the pneumatic line will be sensed by the pneumatic sensor(s) in this example. Alternatively, the sensor elements 61a, 61b on either side of the taxilane/taxiway could be a laser transmitter and received, with a laser beam 60 crossing the runway and sensing passage of the airplane's nosegear when the laser beam is interrupted by said nosegear. In either case, the sensor output(s) from the sensor(s) 61a, 61b will preferably be fed to a ground based computer 62.

The ground based computer 62 will fix the longitudinal position of the nosewheel(s) at the known location of the sensor, and transmit this position information (i.e., longitudinal position on guidepath) at the time the nosewheel(s) crosses the sensor. The ground based computer will also preferably transmit the guidepath ID and the direction (i.e., heading) for positive longitudinal position change (HFPLPC) along this guidepath. This data will be transmitted via a transmitter 64 and received by an airplane on-board receiver 65 (FIG. 13), which will pass on the received data to the airplane onboard autotiller computer 21.

An exemplary embodiment showing how the autotiller computer can use this received data to generate an updated or corrected nosewheel longitudinal position is shown in FIG. 13. The received data can be used to update the estimated longitudinal position of the nosewheel signal obtained from a nosewheel installed odometer, in a manner which will be described in the following.

The first step is to determine exactly when updates should be made to the nosewheel position estimate. This is accomplished by the block labeled "logic to determine whether not update longitudinal position", which outputs an update control signal (UCS) whenever an update is to be made. The general idea is to generate a UCS whenever the nosegear crosses the sensor 60, as indicated by receipt of a signal at the receiver 64. However, it is necessary to prevent generation of spurious UCS signals when the airplane's main gear wheels cross the sensor 60, or when other airplane nose or main gears cross other sensors osn the same or other guidepaths. To prevent generation of UCS when maingear elements cross the sensor element 60, one approach is to inhibit generation of a UCS for a period of time after nosegear passage has been sensed, e.g., inhibit generation of UCS for time intervals between T1 and T2 seconds after the most recent nosegear passage, where T1=(0.25×wheelbase/average corrected groundspeed from the time of most recent nosegear passage), and T2=(1.75×wheelbase/average corrected groundspeed from time of most recent nosegear passage). The corrected groundspeed si synthesized in the "Synthesize Corrected Groundspped" block from a nosewheel odometer signal (i.e., groundspeed is substantially equal to the wheelspeed which is the time derivative of the nosewheel odometer signal) optionally combined with a groundspeed signal from the Air Data Inertial Reference System (ADIRS) or Inertial Reference System.

To inhibit generation of spurious UCS from passage of other airplane gear over sensors on other guidepaths, UCS generation will be inhibited if the received signal identifies a guidepath ID not corresponding to the current guidepath being followed by the subject airplane. To inhibit spurious UCS signals from being generated by other airplanes at other locations on the same guidepath, update sensor locations on a given guidepath can be sufficiently separated that the received signal strength can be used as an indicator of whether the signal is coming from the subject airplane's gear passage or another airplane's gear passage. Directional transmission of the sensor signal by the transmitters 64 can also help prevent such spurious nosegear passage identifications.

A Nosewheel Distance Traveled signal is computed by subtracting the nosewheel odometer signal from the time of the most recent UCS from the (current) nosewheel odometer signal. If the airplane is moving in a direction of decreasing longitudinal position along the guidepath, the nosewheel distance traveled signal is subsequently multiplied by −1. Whether or not to multiply by −1 is determined by a block which compares Heading for Positive Longitudinal Position Change (received from the receiver) with actual airplane heading (from ADIRS/IRS). Alternatively, a computed nosewheel heading synthesized from airplane heading and nosewheel steering angle, may be used instead of plain airplane heading for this comparison.

The nosewheel distance traveled signal, with the appropriate sign multiplier (±1), is then added to the longitudinal position on the guidepath received by the receiver at the time of the most re cent UCS. This sum is passed through a rate limiter to synthesize the final corrected or updated nosewheel longitudinal position. A typical rate limit schedule is as follows:

Rate limit=max (A, B×Airplane Corrected Groundspeed)
where typical values are A=10 ft./sec., B=1.3.

The use of the rate limiter prevents sudden jumps in the corrected nosewheel longitudinal position signal when a UCS signal is received. A filter such as a first order lag filter or a lead-lag filter, or an easy-off/easy-on transition could optionally be used in lieu of or in addition to the rate limit.

Figure 14:
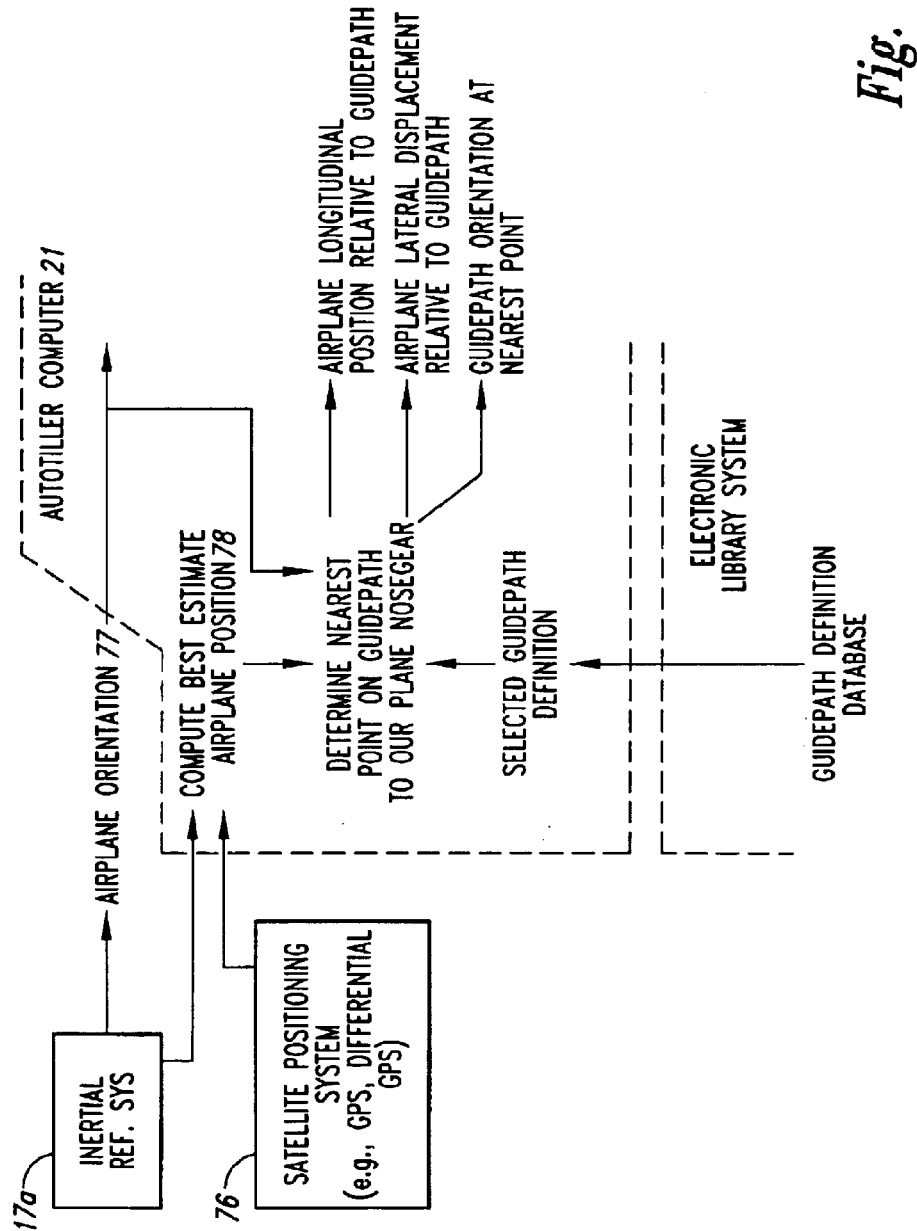
FIG. 14 shows an inertial/satellite positioning method of estimating airplane position on the ground.

FIG. 14 shows an inertial/satellite based method of sensing airplane position. With this method, airplane orientation (i.e., heading angle specifying azimuthal orientation of fuselage centerline relative to true or magnetic North) information is obtained from an inertial reference system 17A. Airplane position information (i.e., precise longitude and latitude at a reference point such as the pilot's station or the inertial reference system location) is obtained from the inertial reference system and/or a satellite positioning system 76 such as the Global Positioning System (GPS). The autotiller computer may synthesize a consolidated "best estimate" airplane position using inputs from both the inertial reference system and the GPS input. The autotiller computer can then use the airplane position and orientation information compared with a selected guidepath geometric definition (e.g., obtained from an electronic library system) to determine the nearest point on the guidepath to the airplane's nosegear or other reference point. By comparing the airplane position and orientation to the guidepath position and orientation at the nearest point, the airplane's longitudinal position and lateral displacement relative to the guidepath can be easily determined. A differential GPS system using local substation(s) could potentially provide enhanced precision to support the autotiller function.

Figure 15:
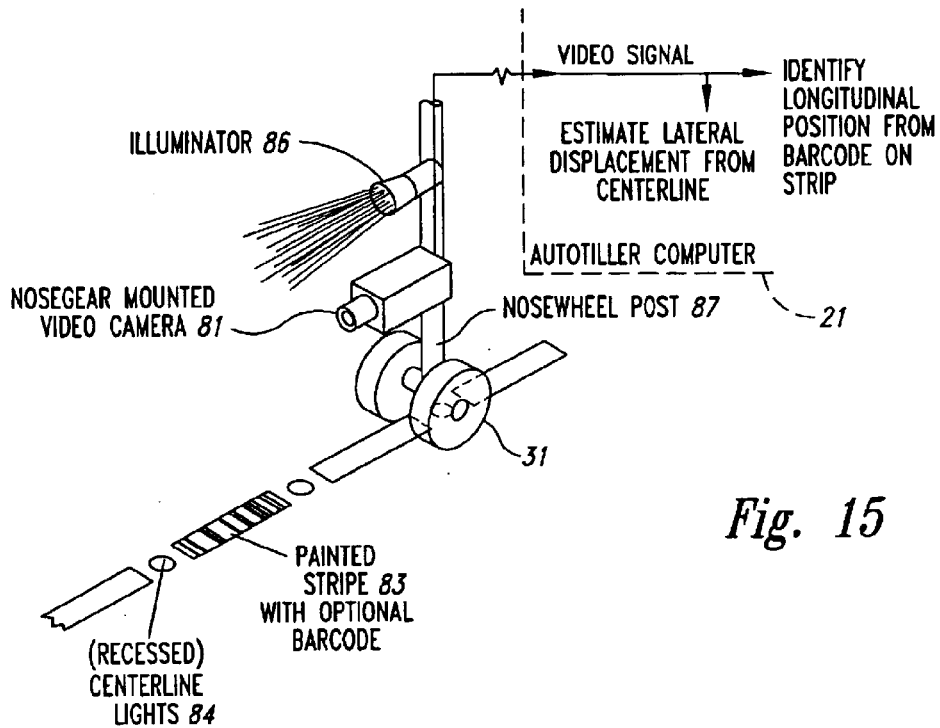
FIGS. 15–18 show optical methods of sensing airplane lateral position on the ground.
Figure 16:
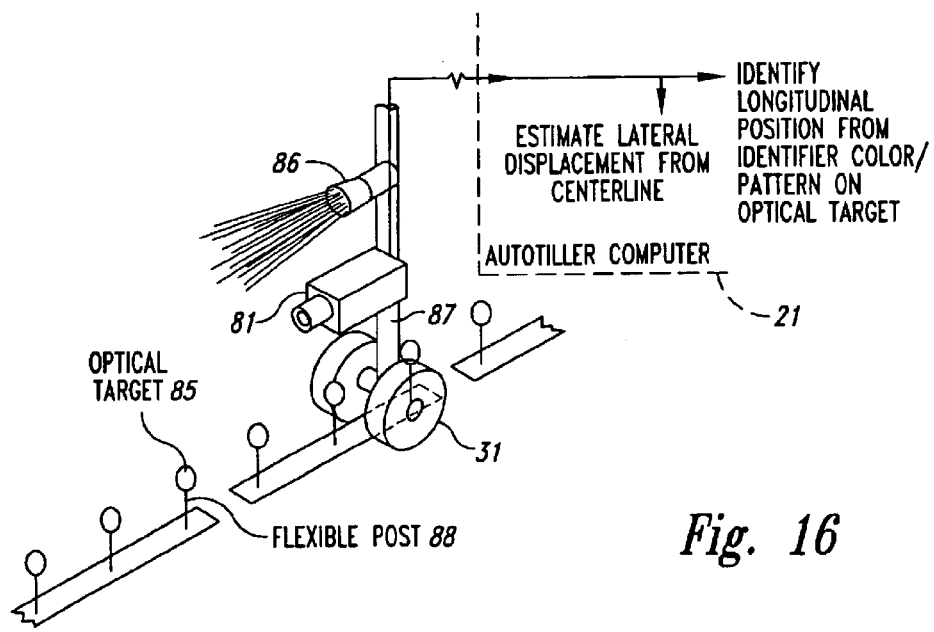

FIGS. 15 and 16 show two representative optical methods of sensing airplane position on the ground. FIG. 15 shows an embodiment in which an airplane mounted video camera 81 views a nosewheel guide stripe 83 painted on the ground surface. The video camera will preferably be mounted on the nosegear 87. The video signal from the camera will preferably feed into the autotiller computer, which can use this signal to estimate nosegear lateral displacement from the centerline. The autotiller computer could use a pattern recognition algorithm to compute the stripe location relative to the airplane, and thereby; obtain the airplane position relative to the airport using airport layout database information. Optionally, an airplane installed illuminator 86 (e.g., light source) may illumine the painted stripe with ordinary or special characteristic light (e.g., light with-characteristics that make the stripe exhibit phosphorescent characteristics). Centerline lights 84 on the taxilane may also be recognizable by the autotiller computer "seeing" through the video camera. The centerline guidestripe may optionally incorporate "barcodes" or other optically recognizable identifier marks at selected positions along the length of the guidepath, to enable the autotiller computer to identify longitudinal position of the nosegear along the guidepath (e.g., identify taxilane number and location along the taxilane). These identifiers can serve as position fixing updates to an odometric longitudinal position estimating system, in a manner analogous to that discussed relative to FIGS. 12 and 13.

The video camera may optionally be fitted with rain and spray protection hood devices, lens washer and wiper means, etc. of a conventional nature.

FIG. 16 shows a variant of the optical method, with a sequence of optical targets 85 replacing the painted stripe 83. The optical targets are small reflective or painted objected supported above the pavement by flexible posts 86 resembling whip antennae. The posts may be hinged at their bases at or slightly below surface level to more easily allow aircraft wheels, snowplow blades, and other objects to move over the optical targets without damaging the targets or the flexible posts. Some of the optical target s may feature identified colors and/or patters to serve a purpose analogous to the barcodes in the FIG. 15 embodiment.

The optical sensing systems described above provide sensor means for sensing the displacement of an aircraft installed sensor relative to at least one ground installed target with a known positional relationship relative to the desired taxi path (e.g., as represented by the nosewheel guideline).

Figure 17:
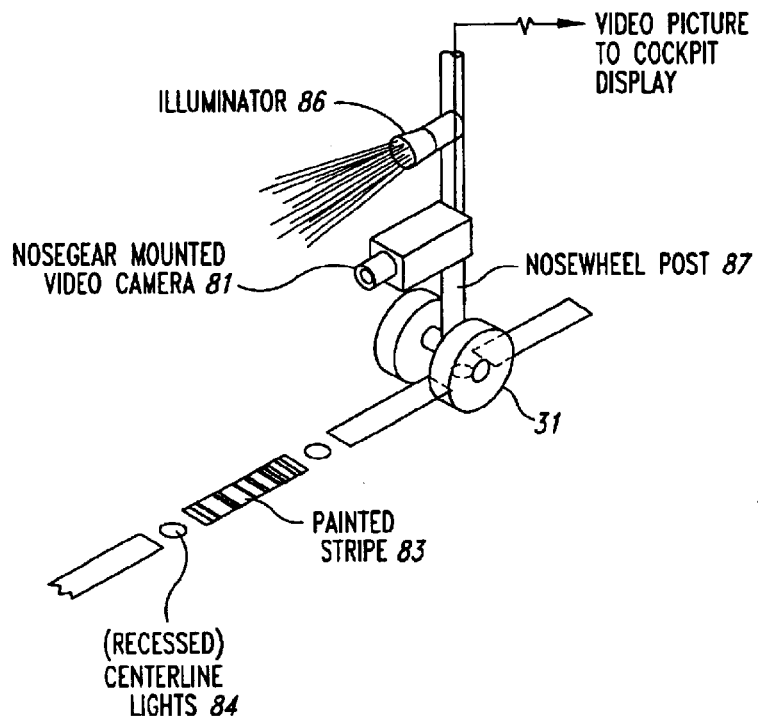
Figure 18:
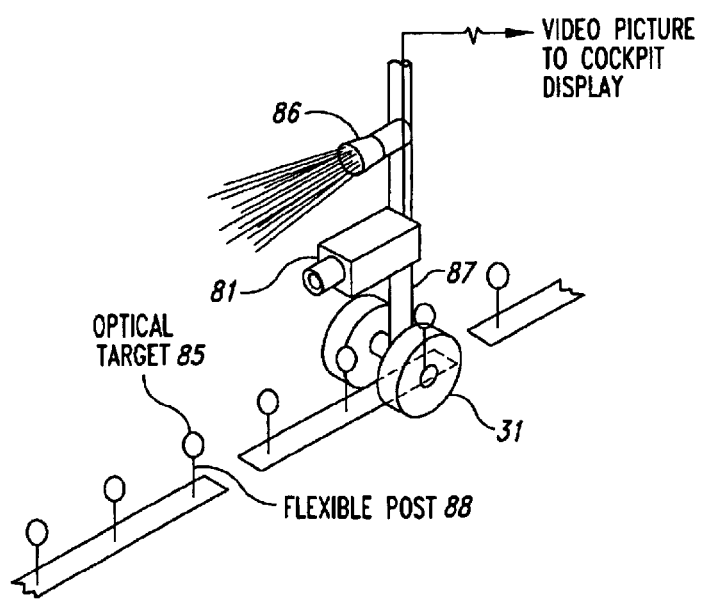

Instead of or in addition to going to the autotiller computer, the video picture of the nosewheel guide strip/optical target may be displayed in the cockpit on a cathode rate tube or flat panel display (FIGS. 17, 18).

Figure 19:
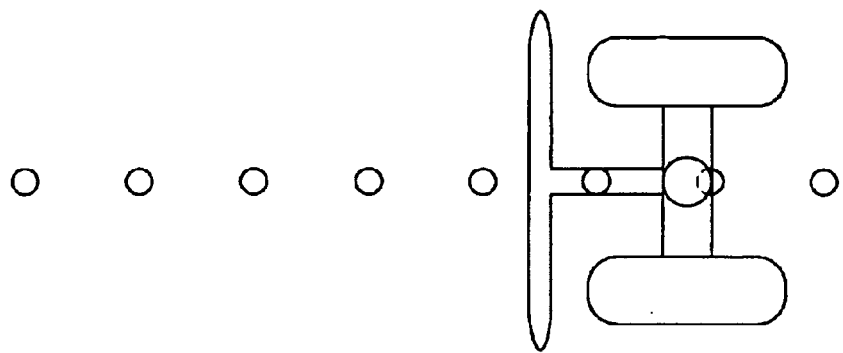
FIGS. 19 and 20 show an electromechanical method of sensing airplane lateral position on the ground.

FIG. 19 shows an embodiment with mechanical/contact sensing means for determining airplane position. A series of flexible posts 90 resembling whip antennae are contacted by an airplane installed contact sensor 91. The contact sensor identifies the lateral position of contact with the posts, and thereby enables computation of the airplane lateral displacement relative to the posts. One implementation of this concept uses laterally separated conductive bands 93 on the contact sensor, separated by insulator 92. These bands are charged with some voltage, which changes for that/those band(s) which contact a conductive post. Knowing which band contacted the post enables identification of the lateral displacement of the contact point. Longitudinal spacing of posts can be in "bar code" type patters to help identify taxilane number and longitudinal location on the taxilane.

The mechanical/contact sensing system described above provides sensor means for sensing the displacement of an aircraft installed sensor relative to at least one ground installed target with a known positional relationship relative to the desired taxi path (e.g., as represented by the nose wheel guideline).

Figure 21A:
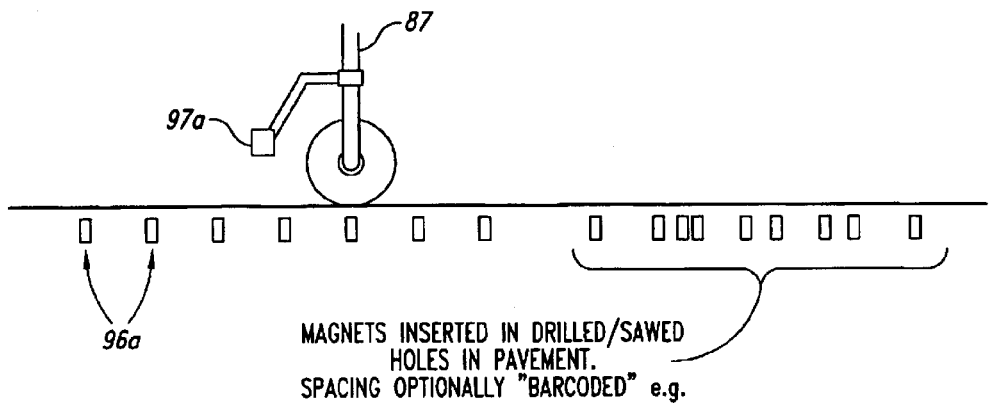
FIGS. 21A and 21B show magnetic and passive element sensing methods for determining airplane lateral position on the ground.
Figure 21B:
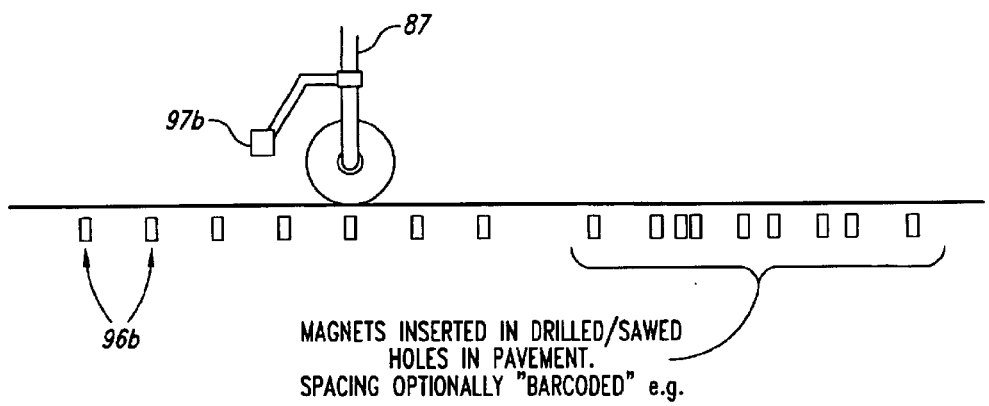

FIGS. 21a–21b shows magnetic and passive element sensing methods for determining airplane position. FIG. 21a shows a series of permanent or electromagnets 96a installed in sequence along the nosewheel guideline, or at a fixed lateral offset therefrom. The location of these magnets relative to the airplane are sensed by airplane installed magnetic sensor(s) 97a.

FIG. 21b shows a series of passive elements 96B installed in sequence along the nosewheel guideline, or at a fixed lateral offset therefrom. The location of these passive elements relative to the airplane are sensed by airplane installed sensor(s) 97B. For example, the passive elements could comprise either (i) highly conductive diamagnetic or paramagnetic material, or preferably (ii) ferromagnetic material with high permeability. The corresponding sensors could be eddy-current inductive displacement transducers (Ref. 21a–21b), preferably with at least two transducers located at separated locations on the airplane.

With either magnetic or passive target elements, the target elements will preferably be installed in holes drilled in the pavement surface. Also, in either case, longitudinal spacing of elements can be "bar coded" to enable the autotiller computer to deduce location and taxiway ID information from the sequence of sensed elements, by comparing the sequence against barcode reference data (indexed to guidepath locations) stored in the airplane's flight management computers) or other computers storing the guidepath database). Thus, the barcode reading can provide either continuous longitudinal position data or longitudinal position fixes in a manner analogous to the use of pneumatic sensor)s) for longitudinal position fixing shown in FIG. 12.

The magnetic/passive element sensing systems described above provide sensor means for sensing the displacement of an aircraft installed sensor relative to at least one ground installed target with a known positional relationship relative to the desired taxi path (e.g., as represented by the nosewheel guideline).

It should be understood that variations and combinations of the airplane positioning systems described above are possible, within the spirit and scope of the invention.

Figure 22:
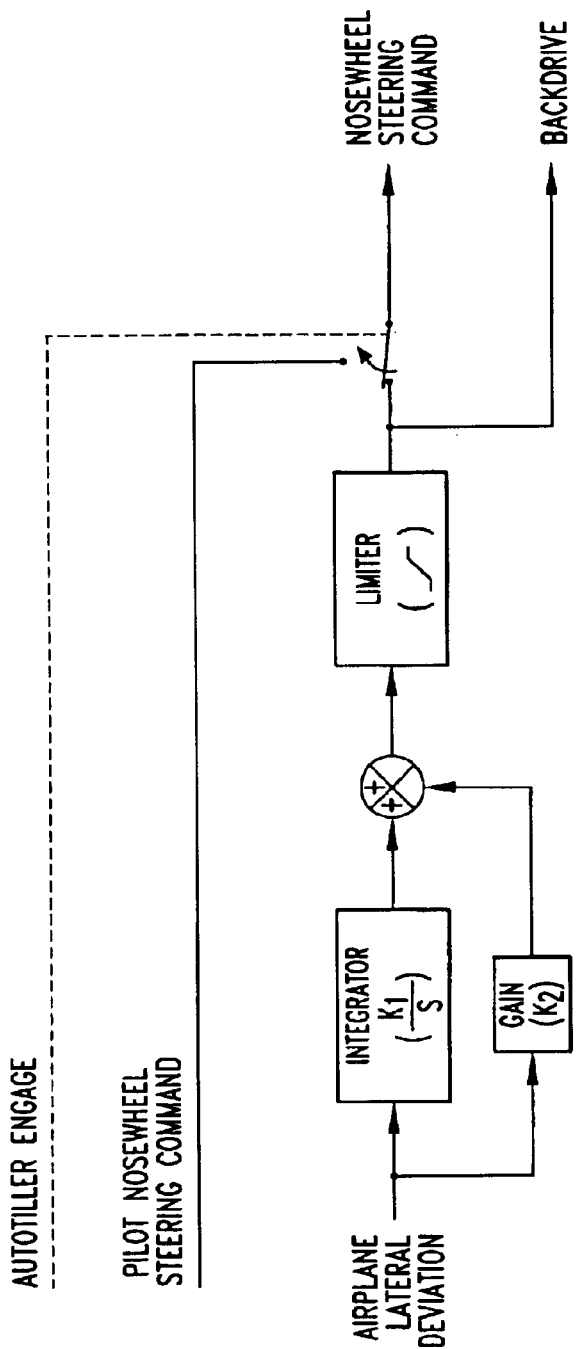
FIGS. 22 and 23A–B show block diagrams of representative control laws for the autotiller function.

FIG. 22 illustrates representative "control laws" or algorithms for implementation in the autotiller computer(s) and/or ACE(s), for use in conjunction with any of the position sensing options described above.

Figure 20:
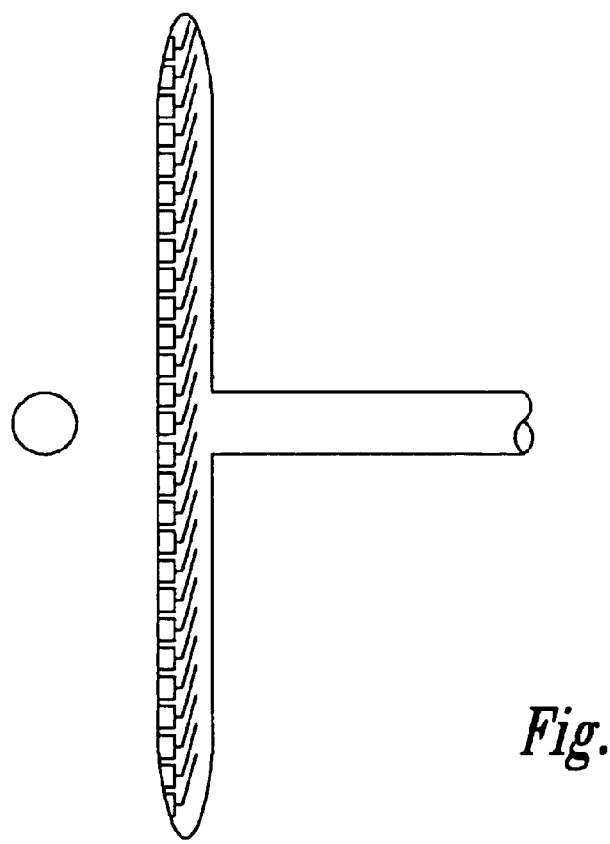

Airplane lateral displacement/deviation can be directly sensed using the wire-following technique of FIGS. 2 and 3 relative to a wire with an identifying guidewire frequency specified from the airplane's longitudinal position along the desired taxi path. Alternatively, airplane lateral displacement can be estimated based on optical inputs (FIGS. 15, 16) or mechanical inputs (FIGS. 19, 20). Another option is to obtain lateral displacement by computation, using inertial and/or satellite positioning system inputs and comparing airplane position with a guidepath geometric definition (FIG. 14).

According to the exemplary control-law embodiment of FIG. 22, whatever the source of the lateral displacement/deviation signal, when autotiller is engaged, airplane lateral displacement/deviation signal, when autotiller is engaged, airplane lateral deviation is treated as an error signal, and run through proportional and integral paths (with gains K2 and K1) and through a limit to generate a nosewheel steering command. When autotiller is engaged, the limited nosewheel steering command is also used to backdrive the tiller and rudder pedals, so as to prevent transients when disengaging autotiller control. The gains K2 and K1 and the authority limit will be scheduled on groundspeed or some othert measure of speed (e.g., wheel speed, airspeed). The nosewheel steering angle command generated will preferably have large steering authority (>20 degrees).

The autotiller will be disengaged when the pilot disengages it via the autotiller engage switch or when the pilot's nosewheel steering command differs from the autotiller steering command by more than a threshold value for more than a threshold time value. When autotiller control is disengaged, steering control commands are received from the tiller/rudder pedals. When autotiller is reengaged, a transient is prevented by synchronizing/initializing the integrator in the autotiller control path in such manner as to prevent a transient. Similar synchronizing means may be used when switching guidewires for a wire following implementation, or when the authority limit is reached.

Figure 23A:
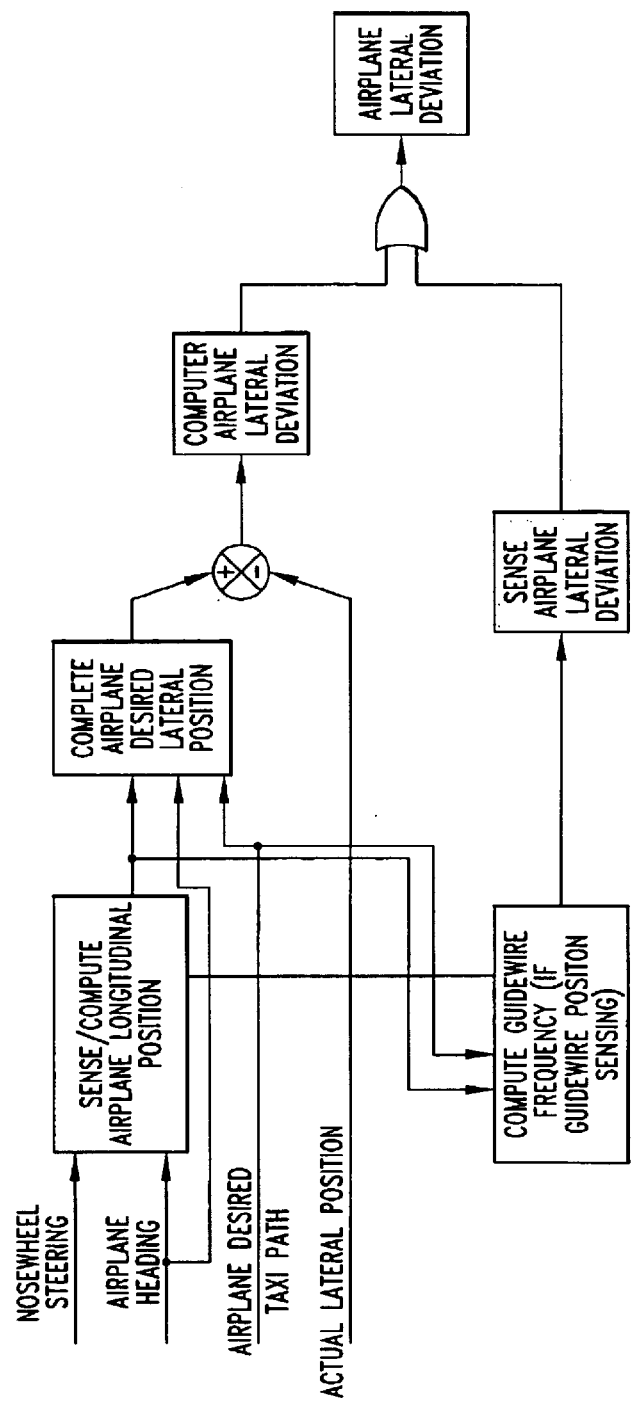
Figure 23B:
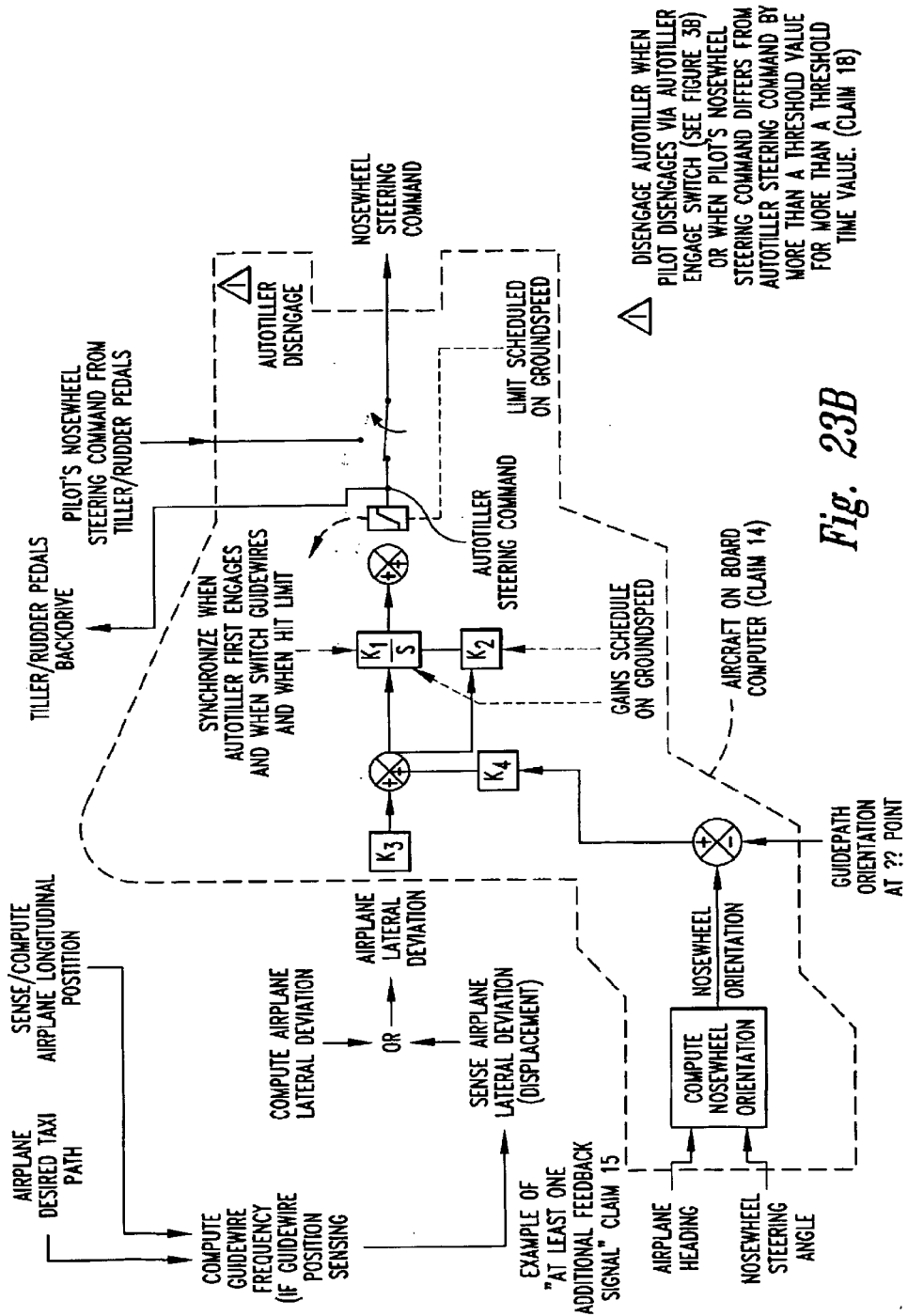

FIG. 23A shows an embodiment similar to FIG. 22, with an additional feedback signal (i.e., airplane heading). Now airplane heading (i.e., heading angle specifying azimuthal orientation of fuselage center line relative to true or magnetic North) and nosewheel steering angle are combined to compute nosewheel orientation, which in turn is compared with the guide path orientation at the minimum distance point (e.g., from FIG. 14) to generate an orientation difference signal. The orientation difference signal is passed through a gain K4 and summed with the airplane lateral deviation passed through a gain 3, to generate a composite error signal which replaces the pure airplane lateral deviation signal fed into the integral and proportional paths in FIG. 22. Combining an orientation error with the displacement error should enable a smoother recapture of guidepath tracking from an initially offset nosewheel position and orientation.

Figure 24:
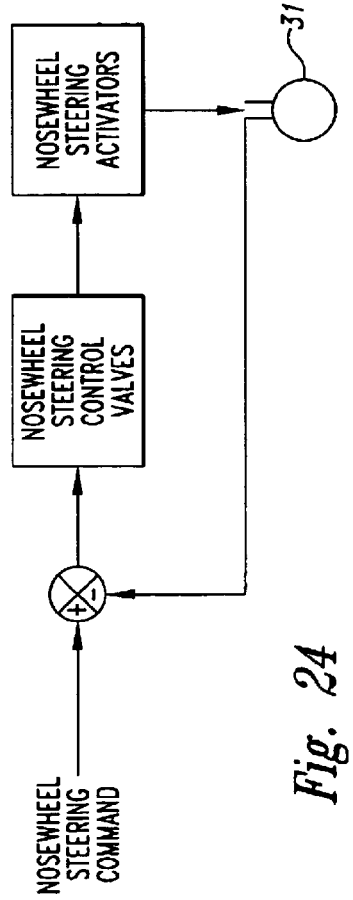
FIG. 24 shows nosegear steering control means.

FIG. 24 illustrates a typical steering control system for making the nosewheel steering follow the nosewheel steering angle command. A sensed nosewheel position provides a nosewheel steering angle feedback, which is subtracted from the nosewheel steering angle command to generate an error signal to one or more nosewheel steering control valves. These steering control valves then transmit hydraulic fluid (for a hydraulically powered nosewheel steering system) to nosewheel steering actuators which steer the nosewheel. The steering position feedback may be either electrical, mechanical, or hydraulic. Electrical steering actuation may also optionally be provided.

Preferred autotiller systems will be designed with redundancy (and dissimilarity as required) in sensors, computers, and data links so as to assure safety. System availability at a function loss rate of $<10^{-5}$/hr and probability of unannunciated/hardover failure of $10^{-9}$ are representative design objectives. Note that an autotiller equipped aircraft can still use airport facilities designed for larger aircraft following autotiller system loss of function. Also, in preferred embodiments the pilot is still "in charge" and has instant override capability and continuous knowledge of what the autotiller is doing (parallel operation). As an option, wingtip collision radar can be added to supplement the autotiller system.

Figure 25:
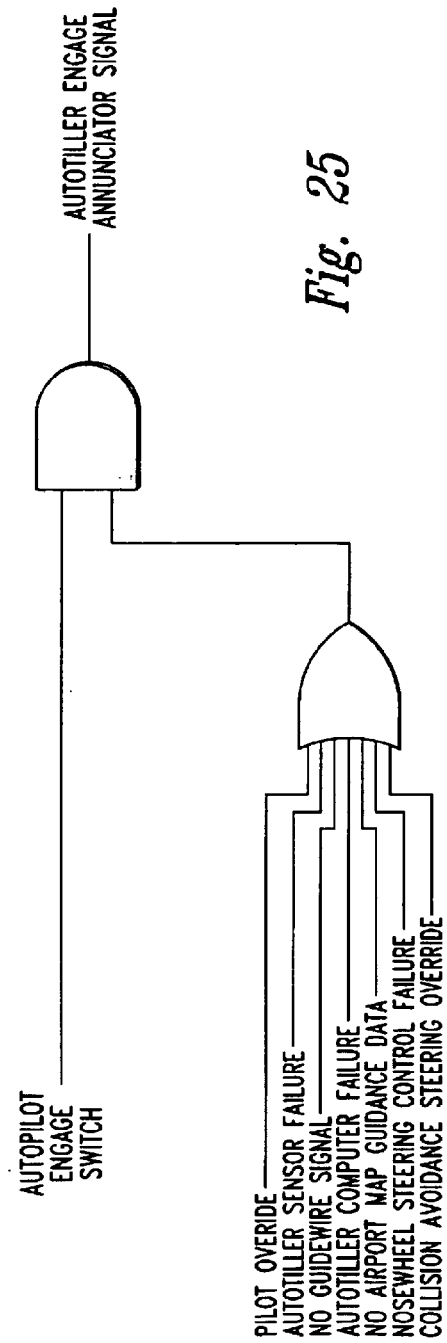
FIG. 25 shows representative logic for annunciating an autotiller failure to the aircraft's flight crew.

Exemplary logic governing annunciation of autotiller manual or automatic disengage to the flight crew is illustrated in FIG. 25.

The autotiller taxi operation will preferably not affect flight crew common-type-rating with equivalent non-autitiller-equipped aircraft in an airline's fleet, as it is used only for on-ground taxi control. It should be notd that a large variety of g ate docking systems with varying symbology are currently in use (Ref. 15) within the scope of common type rating.

The autotiller taxi guidance system can also optionally be extended to full Cat IIIC "autotaxi" capability. With this capability used in conjunction with autoland and automatic takeoff subsystems, it should be possible to allow truly zero visibility airline operations.

Figure 26:
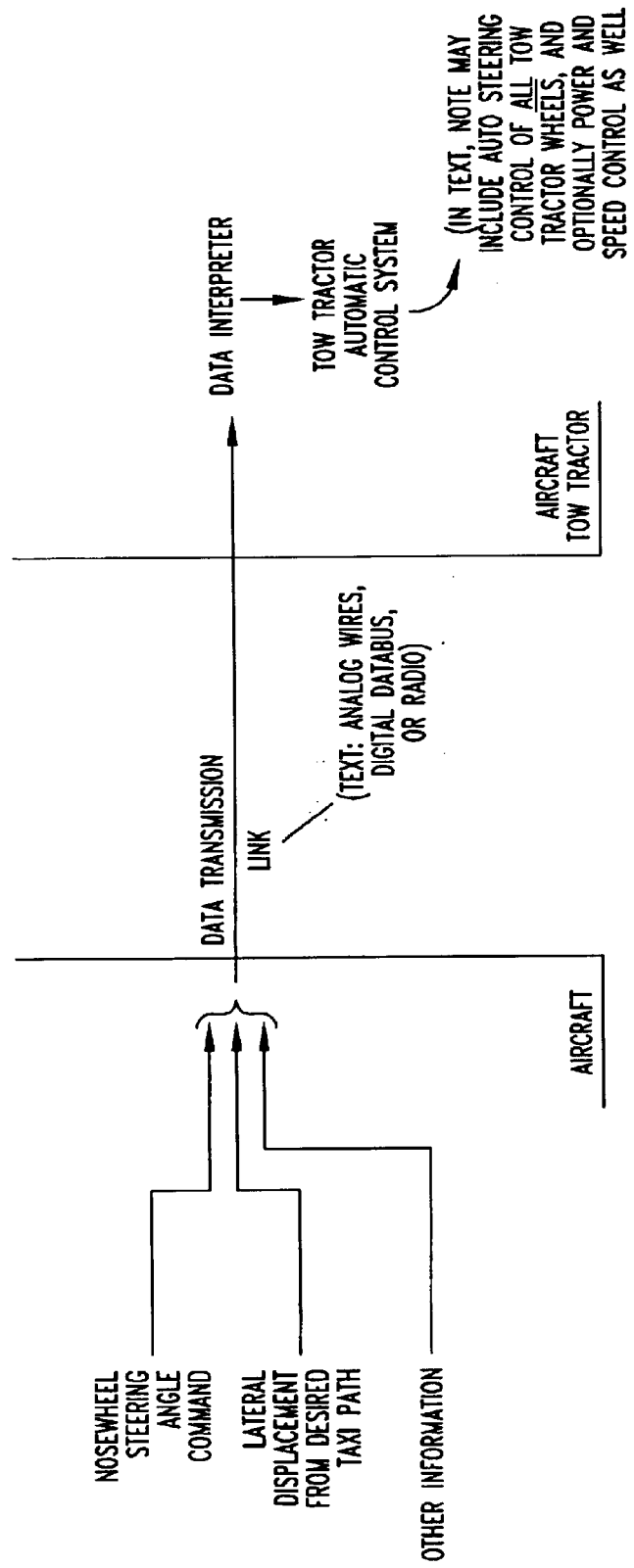
FIG. 26 shows an autotiller transmission means to an aircraft tow tractor.
Figure 28A:
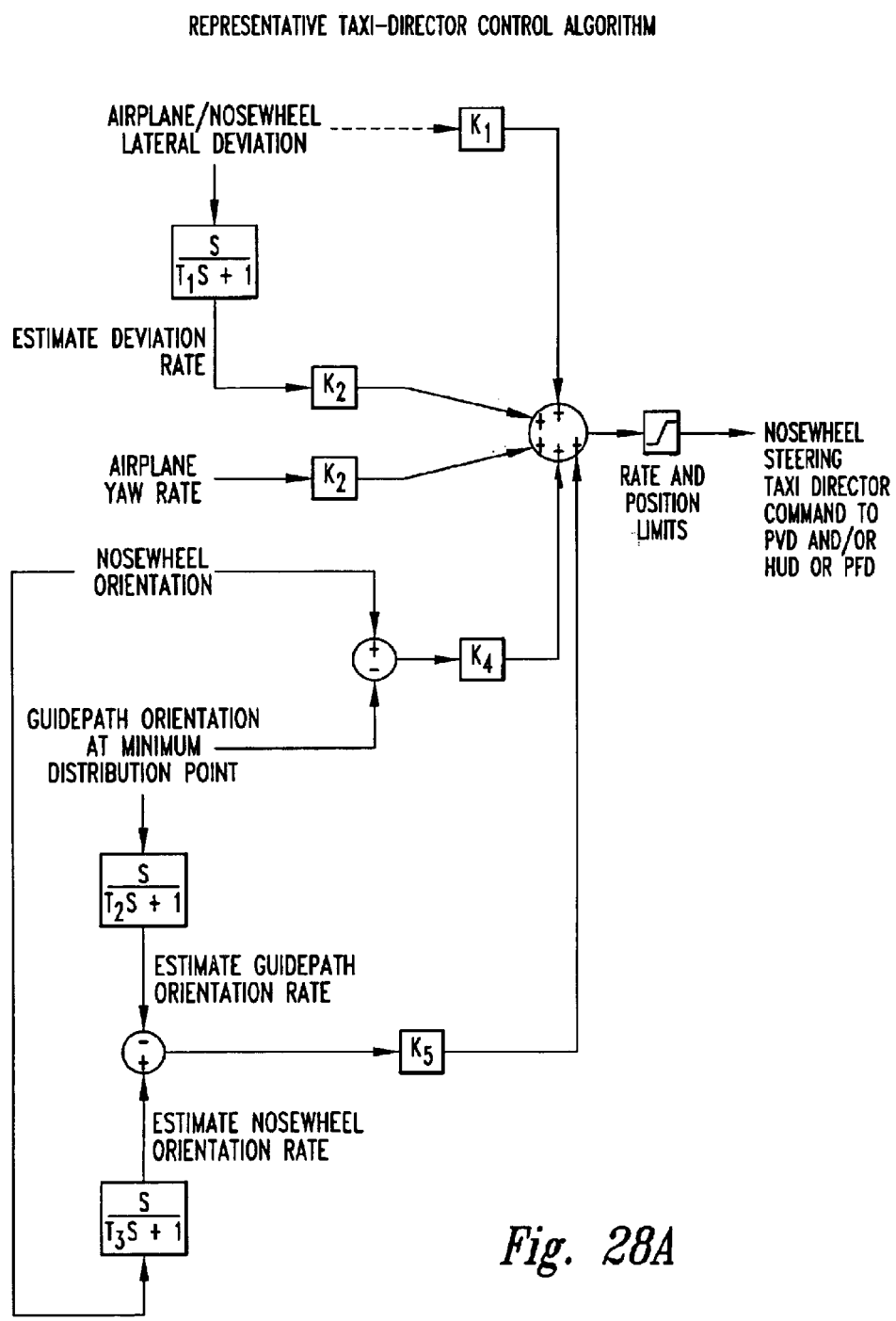
FIGS. 28A–28B show a control law exemplary of embodiments of taxi director cockpit displays.
Figure 28B:
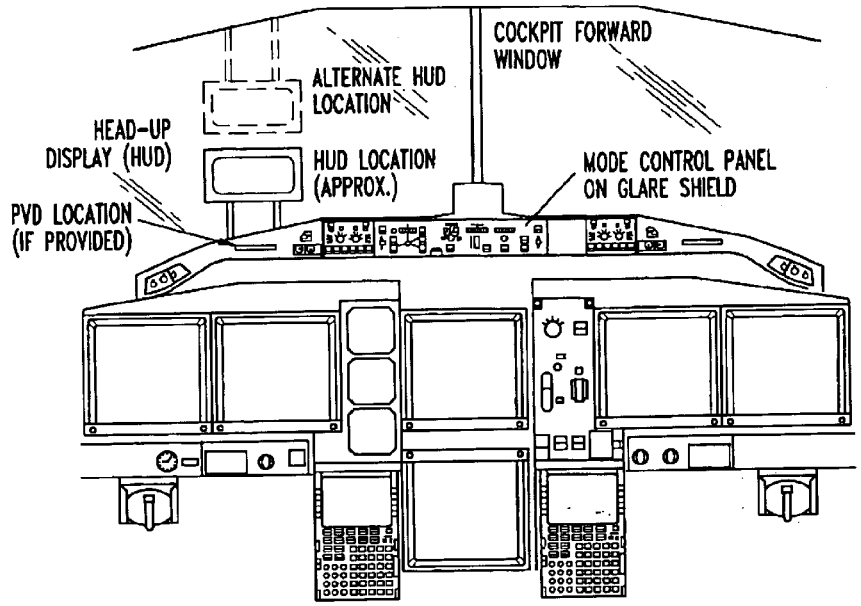
Figure 28C:
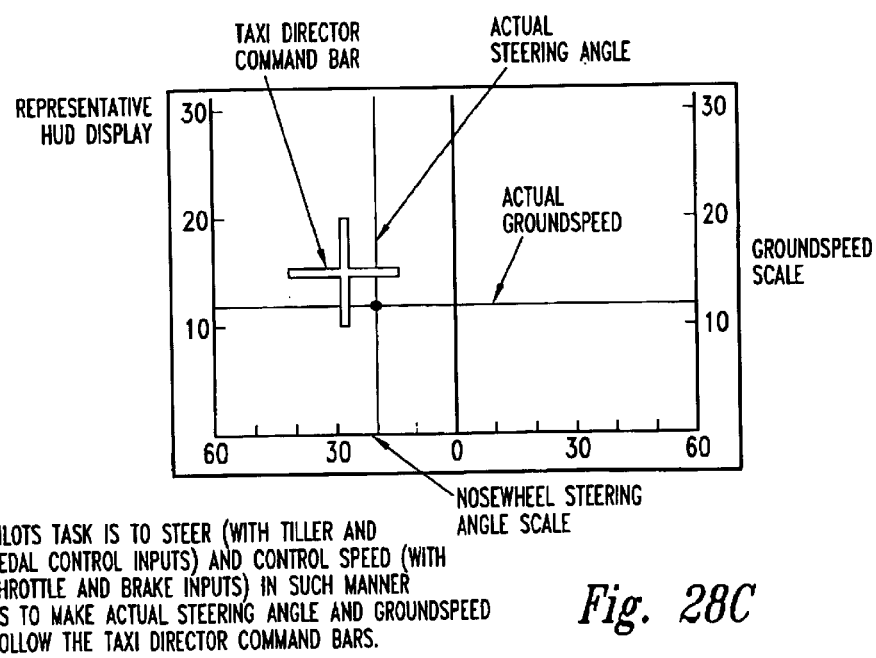

The autotiller invention can also optionally contribute to aircraft pushback from the gate, in the manner illustrated in. FIG. 26. A pushback tractor automatic control system can optionally be provided, whichi "reads and follows": automatic guidance signals from the autotiller equipped aircraft as the aircraft is pushed back. In the embodiment shown in FIG. 26, nosewheel steering angle command, lateral displacement from the desired taxi (i.e., pushback) path, and other information ate transmitted via a data transmission link to the aircraft tow tractor. The data transmission link may be a physical umbilical cord with analog or digital data wires, or it may be a radio link. The received data is interpreted on board the tow tractor by a data interpreter, which then feeds a tow tractor automatic control system. The tow tractor automatic control system will preferably include steering control of all tow tractor wheels, and optionally power/speed control as well. Override capability for the automatically steered pushback may be provided to the tow tractor driver and/or the airplane/s flight crew. If airplanes are parked with their noses very close to the terminal face, low silhouette under-airplane tow tractors or nosegear lifting tractors may need to be used. Another option is use of reverse thrust to power back the airplane with the autotiller system engaged and a ground guideperson indicating "OK to back up" to the pilot.

FIG. 27 shows a block diagram of a variant of the autotiller control system called the "taxi director". The core of the taxi director system is at least one "taxi guidance computer" which is essentially the same as an autotiller computer and may be part of a FBW Primary Flight Computer or an Autopilot Flight Control Computer. The taxi guidance computer incorporates taxi director engage/disengage, lane switching, incremental steering, and crew annunciation functions.

The operation of the exemplary embodiment shown in FIG. 27 can be described in further detail as follows, in a manner analogous to the operation of the autotiller embodiment of FIG. 9. The pilot can make ground steering command inputs with either foot operated rudder pedals 10 or a hand operated steering tiller 8. The copilot can also make steering inputs with his rudder pedals, and with a steering tiller if provided (copilot's steering tiller is typically not standard equipment). The steering tiller 8 provides a pilot hand operable steering control input device for making directional control inputs. The positions of the rudder pedal 10 and steering tiller 8 are measured by transducer means and are interpreted by the ground steering control system 18 as steering commands 9. The transducer(s) provide manual steering command generation means for generating nosewheel steering angle commands 9. The rudder pedals and steering tiller may be mechanically tied together for small tiller deflections, to prevent command discrepancies between the two input devices. Alternatively, their commands may be electronically combined to synthesize a single ground directional control command. In either case, after full rudder pedal throw is achieved, the steering tiller can be rotated further to generate additional steering command.

The ground steering control system 18 may be a conventional mechanical nosewheel steering control system or a fly-by-wire/fly-by-light (FBW/.FBL) steering control system. The ground steering control system 18 controls the nosewheel steering actuation system 19 in such manner as to cause the nosewheel 21 to steer to an angle which follows the steering command 9. The ground steering control system 18 accomplishes this function by using nosewheel position error to generate a feed forward command to the nosewheel steering actuation system 19; receiving a feedback signal of actual nosewheel steering position from a position sensing transducer; and computing the nosewheel position error from the difference between commanded and actual nosewheel position. The above-described method of control of the nosewheel steering serves as nosewheel steering control means for positioning the nosewheel steering so as to follow the nosewheel steering angle command from the manual steering command generation means.

When the pilot requests engagement of taxi director operation by using a taxi director select switch 5 (probably installed on the glareshield mounted mode control panel), and when the following conditions are met, the taxi guidance computer(s) 12 begin taxi director operation and provide crew annunciation 23 of the start of taxi director operation:

| Conditions (TBV) | Airplane on-ground, speed < 40 knots<br>Heading angle, groundspeed data available from ADIRS Air data inertial system) or the IRS (inertial reference system)<br>Navigation/guidance data available from airport map from FMC (flight management computer)<br>Displacement from guidewire available from steering antenna pairs |
|---|---|

When the taxi guidance computers 12 start taxi guidance, they use a control algorithm to drive a taxi director display 16 to aid the pilot in steering the airplane so as to drive lateral displacement from the guidewire towards zero: The displacement from the guidewire is measured by airplane installed steering antenna pairs 15, which measure the airplane's lateral displacement relative to taxilane imbedded guidwires 14, using the inductive principle described in References 16 and 31A. The steering antenna pairs 15 provide means for estimating lateral displacement of the aircraft from a desired taxi.

While certain preferred embodiments have been described in detail above, it should be understood that further modifications and variations can be made within the spirit and scope of the invention as defined in the appended claims.

REFERENCES

1. J. G. Bender, et.al., "Systems Studies of Automated Highway Systems (Final Report)", FHWA/RD-82/003, July 1982)
2. J. G. Bender, et.al., "Systems Studies of Automated Highway Systems, Appendix I: Conceptual Automated Highway System Designs", FHWA/RD-82/129, August 1981)
3. J. G. Bender, et.al., "Systems. Studies of Automated Highway Systems, Appendix II: Analysis of Automated Highway Systems", FHWA/RD-82/130, August 1981)
4. J. G. Bender, et,al., "Systems Studies of Automated Highway Systems, Appendix III: Automated Highway System Trade Studies", FHWA/RD-82/131, August 1981)
5. P. Boegli, "A Comparative Evaluation of AGV Navigation Techniques", in Proceedings of the 3rd International Conference on Automated Guided Vehicle Systems held on 15–17 October 1985 in Stockholm, Sweden, publ. by IFS Publications Ltd., Kempston, Bedford, U.K., October 1985).
6. W. Darenberg et.al., "Automated Guidance System for Buses and Trucks", in Proceedings of the 1st International Conference on Automated Guided Vehicle Systems, held Jun. 2–4, 1981 at Stratford-upon-Avon, U.K., publ. by IFS Publications Ltd., Kempston, Bedford, U.K., June 1981)
7. Federal Aviation Administration Advisory Circular AC 1505300-12 CHG 1, Mar. 14, 1985.
8. R. L. French, "Cars That Know Where They're Going", The Futurist, May–June 1989.
9. Gayet, "Fixed Aircraft Ground Servicing Facilities, Part One Existing Eqiupment", Vol. 8, Institut de Transport Aerien, Paris, 1988
10. Hammond, Gary, AGVS at Work, Springer-Verlag, N.Y., 1986
11. Jane's Airport Equipment 1987–88, Jane's Publishing Inc., New York, 1987
12. N. Komatsu and N. Nakano, "Dead Reckoning Guidance Combined With Guide Path Method for AGV's" in Proceedings of the 5th International Conference on Automated Guided Vehicle Systems, held Oct. 6–8, 1987 in Tokyo, Japan, publ. By IFS Publications Ltd., Kempston, Bedford, U.K., October 1987.
13. Harry N. Norton, Handbook of Transducers, Prentice Hall, Englewood Cliffs, N.J., 1989.
14. "Nosewheel Sensors Act as Pilot's Eyes", Airports International, p. 41, January 1989.

What is claimed is:

1. An automatic control system for directional control of an aircraft moving on the ground, comprising:
    a pilot hand operable steering control input device for making directional control inputs;
    manual steering command generation means for generating a nosewheel steering angle command from the pilot's input to said hand operable steering control input device;

means for estimating lateral displacement of the aircraft from a desired taxi path;

automatic steering command generation means for generating a nosewheel steering angle command which tends to zero said lateral displacement; and, nosewheel steering control means for positioning the nosewheel steering so as to follow the nosewheel steering angle command from either the manual steering command generation means or the automatic steering command generation means depending on whether automatic ground steering is disengaged or engaged.

2. The automatic control system of claim 1, further comprising backdrive means for positioning said hand operable steering control input device when automatic ground steering is engaged, in such manner that the position of said hand operable steering control input device would result in the manual steering command generation means generating a nosewheel steering angle command substantially equal to the nosewheel steering angle command being generated by the automatic steering command generation means if automatic ground steering were not engaged.

3. The automatic control system of claim 1, further comprising pilot operable rudder pedals for making small directional control inputs smaller than a threshold magnitude, and means for linking said hand operable steering control input device and said rudder pedals when directional control inputs being made are small or nonexistent.

4. The automatic control system of claim 1, wherein said hand operable steering control input device is a tiller.

5. The automatic control system of claim 4, wherein said computer means includes at least one of the following elements: (i) a gain, (ii) a filter, (iii) a deadzone, (iv) a limit.

6. The automatic control system of claim 1, wherein said manual steering command generation means include transducer means for measuring the position of said hand operable steering control input device and computer means for generating said nosewheel steering angle command from said position.

7. The automatic control system of claim 1, wherein said means for estimating lateral displacement comprises inductive means for sensing the displacement of aircraft installed antennae relative to at least one ground installed guidewire with a fixed positional relationship relative to said taxi line.

8. The automatic control system of claim 1, wherein said means for estimating lateral displacement includes aircraft installed inertial navigation means for updating aircraft inertial position from an initial position fix.

9. The automatic control system of claim 1, wherein said means for estimating lateral displacement comprises sensor means for sensing the displacement of an aircraft installed sensor relative to at least one ground installed sensor target with a known positional relationship relative to said taxi path.

10. The automatic control system of claim 1, wherein said means for estimating lateral displacement includes odometric means for sensing distance traveled by the aircraft.

11. The automatic control system of claim 1, wherein said means for estimating lateral displacement includes means for estimating aircraft position using signals received from satellites.

12. The automatic control system of claim 1, wherein said means for estimating lateral displacement includes ground installed pneumatic sensor means for sensing passage of at least one aircraft wheel over said pneumatic sensor means.

13. The automatic control system of claim 1, wherein said means for estimating lateral displacement includes aircraft onboard computer memory means for storing data specifying the layout geometry of said taxi line and other taxi lines for a plurality of airports.

14. The automatic control system of claim 1, wherein said automatic steering command generation means includes an aircraft on-board computer which receives a signal indicative of said lateral displacement and which processes said signal to generate said nosewheel steering angle command.

15. The automatic control system of claim 14, wherein said computer also receives at least one additional feedback signal.

16. The automatic control system of claim 1, wherein said automatic steering command generation means includes an aircraft on-board computer which receives a signal indicative of said lateral displacement and which passes said signal through proportional and integral command generation paths to generate said nosewheel steering angle command.

17. The automatic control system of claim 1, with pilot operable means for engaging and disengaging automatic ground steering.

18. The automatic control system of claim 1, wherein pilot operation of said hand operable steering control input device when automatic ground steering is engaged will cause automatic ground steering to disengage.

19. The automatic control system of claim 1, further comprising automatic steering means for preventing said aircraft from colliding with another object when sensor means for detecting an impending collision detect an impending collision.

20. The automatic control system of claim 1, further comprising automatic braking means for preventing said aircraft from colliding with another object when sensor means for detecting an impending collision detect an impending collision.

21. The automatic control system of claim 1, further comprising means for transmitting the nosewheel steering angle command from the automatic steering command generation means to an on-ground aircraft tractor towing the aircraft on the ground.

22. The automatic control system of claim 1, further comprising means for transmitting information including said lateral displacement to an on-ground aircraft tractor towing the aircraft on the ground.

23. The automatic control system of claim 1, further comprising means for estimating a second lateral displacement of the aircraft from a second taxi line and means for switching the taxiline being followed by switching said automatic steering command generation means from tending to zero said lateral displacement to tending to zero said second lateral displacement.

24. The automatic control system of claim 1, further comprising means for annunciating failures of said automatic control system to said pilot.

25. An automatic control system for directional control of an aircraft moving on the ground, comprising:

a pilot operable steering control input device for making large authority directional control inputs;

manual steering command generation means for generating a large steering authority nosewheel steering angle command from the pilot's input to said steering control input device;

means for estimating lateral displacement of the aircraft from a desired taxi path, which desired taxi path may include turns requiring large steering authority for said aircraft to follow;

automatic steering command generation means for generating a large steering authority nosewheel steering angle command which tends to zero said lateral displacement; and, nosewheel steering control means for positioning the nosewheel steering so as to follow the large steering authority nosewheel steering angle command from either the manual steering command generation means or the automatic steering command generation means depending on whether automatic ground steering is disengaged or engaged.

26. The automatic control system of claim 25, further comprising backdrive means for positioning said steering control input device when automatic ground steering is engaged, in such manner that the position of said steering control input device when the pilot is making no control input to said steering control input device would result in the manual steering command generation means generating a nosewheel steering angle command substantially equal to the nosewheel steering angle command being generated by the automatic steering command generation means if automatic ground steering were not engaged.

27. The automatic control system of claim 25, wherein said manual steering command generation means comprises at least one position transducer which measures the position of said pilot operable steering control input device.

28. The automatic control system of claim 25, wherein said-manual steering command generation means comprises at least one force transducer which measures the force exerted on said pilot operable steering control input device by the pilot.

29. An automatic guidance system for aiding a pilot in precisely steering an aircraft moving on the ground comprising:
   at least one pilot operable steering input device for making directional control inputs;
   manual steering command generation means for generating a nosewheel steering angle command from the pilot's input to said pilot operable steering control input device;
   nosewheel steering control means for positioning the nosewheel steering so as to follow the nosewheel steering angle command from the manual steering command generation means;
   means for estimating displacement of the aircraft from a desired taxi path and for generating a lateral displacement signal indicative of said lateral displacement;
   automatic steering command generation means for generating a steering guidance command signal using said lateral displacement signal as an input; and
   steering command display means for displaying said steering guidance command signal to the pilot and for aiding the pilot in precisely steering the aircraft along said desired taxi path.

30. The automatic guidance system of claim 29, with pilot operable means for engaging and disengaging display of ground steering guidance commands.

31. An automatic guidance system for directional control inputs;
   a pilot operable steering control input device for making directional control inputs;
   manual steering command generation means for generating a large steering authority nosewheel steering angle command from the pilot's input to said steering control input device;
   means for estimating lateral displacement of the aircraft from a desired taxi path, which desired taxi path may include turns requiring large steering authority for said aircraft to follow;
   automatic steering command generation means for generating a large steering authority steering angle command display for aiding the pilot in controlling the directional path of the aircraft so as to tend to zero said lateral displacement; and
   nosewheel steering control means for positioning the nosewheel steering so as to follow the large steering authority nosewheel steering angle command from the manual steering command generation means.

* * * * *